United States Patent
Lippincott

(10) Patent No.: US 9,654,724 B2
(45) Date of Patent: *May 16, 2017

(54) PROGRAMMABLE VIDEO PROCESSING AND VIDEO STORAGE ARCHITECTURE

(71) Applicant: INTEL CORPORATION, Santa Clara, CA (US)

(72) Inventor: Louis A. Lippincott, Los Altos, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/326,037

(22) Filed: Jul. 8, 2014

(65) Prior Publication Data

US 2015/0110463 A1    Apr. 23, 2015

Related U.S. Application Data

(63) Continuation of application No. 10/750,544, filed on Dec. 31, 2003, now Pat. No. 8,812,749.

(51) Int. Cl.
| | |
|---|---|
| *G06F 3/00* | (2006.01) |
| *H04N 5/91* | (2006.01) |
| *H04N 5/76* | (2006.01) |
| *H04N 5/911* | (2006.01) |
| *H04N 9/804* | (2006.01) |
| *G06F 1/32* | (2006.01) |

(52) U.S. Cl.
CPC ............. *H04N 5/91* (2013.01); *G06F 1/3203* (2013.01); *H04N 5/76* (2013.01); *H04N 5/911* (2013.01); *H04N 9/8042* (2013.01)

(58) Field of Classification Search
None
See application file for complete search history.

(56) References Cited

U.S. PATENT DOCUMENTS

| | | | |
|---|---|---|---|
| 4,065,808 A | 12/1977 | Schomberg et al. | |
| 4,891,751 A | 1/1990 | Call et al. | |
| 4,933,836 A | 6/1990 | Tulpule et al. | |

(Continued)

FOREIGN PATENT DOCUMENTS

| | | |
|---|---|---|
| EP | 0257581 A2 | 3/1988 |
| EP | 1324604 A2 | 7/2003 |

(Continued)

OTHER PUBLICATIONS

Office Action received for United Kingdom's Patent Application No. 0608720.9, mailed on Oct. 23, 2008, 3 Pages.

(Continued)

*Primary Examiner* — Henry Tsai
*Assistant Examiner* — Aurangzeb Hassan
(74) *Attorney, Agent, or Firm* — Lynch Law Patent Group, P.C.

(57) ABSTRACT

In an embodiment, a method includes receiving video into a video display device. The method also includes storing, by at least one processor, the video into a memory, upon determining that the video display device is in a storage mode. Additionally, the method includes performing enhanced image processing on the video with the at least one processor, upon determining that the video display device is in an image processing mode.

20 Claims, 23 Drawing Sheets

(56) References Cited

U.S. PATENT DOCUMENTS

| | | | |
|---|---|---|---|
| 5,151,783 A * | 9/1992 | Faroudja | 348/448 |
| 5,541,640 A | 7/1996 | Larson | |
| 5,557,734 A | 9/1996 | Wilson | |
| 5,617,577 A | 4/1997 | Barker et al. | |
| 5,630,161 A | 5/1997 | Branco et al. | |
| 5,689,647 A | 11/1997 | Miura | |
| 5,828,835 A | 10/1998 | Isfeld et al. | |
| 5,841,444 A | 11/1998 | Mun et al. | |
| 5,911,056 A | 6/1999 | Faget et al. | |
| 5,973,752 A | 10/1999 | Matsunaga | |
| 6,389,174 B1 | 5/2002 | Liu et al. | |
| 6,598,145 B1 | 7/2003 | Dally et al. | |
| 6,747,693 B1 * | 6/2004 | Yamashita et al. | 348/222.1 |
| 6,757,019 B1 | 6/2004 | Hsieh et al. | |
| 6,804,193 B1 | 10/2004 | Dubreuil | |
| 6,952,576 B2 | 10/2005 | Fish et al. | |
| 6,967,950 B2 | 11/2005 | Galicki et al. | |
| 7,889,951 B2 | 2/2011 | Lippincott | |
| 8,428,442 B2 | 4/2013 | Kendall | |
| 2003/0063213 A1 | 4/2003 | Poplin | |
| 2003/0191623 A1 | 10/2003 | Salmonsen | |
| 2003/0204853 A1 * | 10/2003 | Fries et al. | 725/93 |
| 2003/0208638 A1 | 11/2003 | Abrams, Jr. et al. | |
| 2004/0073321 A1 * | 4/2004 | Kondo | 700/28 |
| 2004/0257372 A1 | 12/2004 | Lippincott | |
| 2005/0001705 A1 | 1/2005 | Watanabe | |
| 2005/0285944 A1 | 12/2005 | Watanabe et al. | |
| 2006/0153305 A1 | 7/2006 | Guenebaud | |

FOREIGN PATENT DOCUMENTS

| | | |
|---|---|---|
| JP | 05-056372 A | 3/1993 |
| JP | 06-56732 A | 3/1994 |
| JP | 06-125539 A | 5/1994 |
| JP | 06-139210 A | 5/1994 |
| JP | 10-74364 A | 3/1998 |
| JP | 2001-36484 A | 5/2001 |
| JP | 2002-514023 A | 5/2002 |
| JP | 2003-510669 A | 3/2003 |
| WO | 99/23817 A1 | 5/1999 |
| WO | 2005/001705 A1 | 1/2005 |
| WO | 2005/067290 A2 | 7/2005 |
| WO | 2005/067290 A3 | 7/2005 |

OTHER PUBLICATIONS

Office Action received for Korean Patent Application No. 10-2006-7012934, mailed on Jul. 23, 2007, 5 Pages of Office Action and 5 Pages of English Translation.

Office Action received for German Patent Application No. 112004002609.1, mailed on Sep. 29, 2009, 5 Pages of Office Action and 5 Pages of English Translation.

Notice of Allowance received for Chinese Patent Application No. 200480039178.1, mailed on Jun. 12, 2009, 2 Pages of Notice of Allowance and 3 Pages of English Translation.

Examiner Interview Summary received for Japanese Patent Application No. 2006-547296, mailed on Oct. 6, 2010, 2 pages.

Notice of Allowance received for Japanese Patent Application No. 2006-547296, mailed on Aug. 7, 2012, 2 Pages of Notice of Allowance only.

Office Action received for Japanese Patent Application No. 2006-547296, mailed on Nov. 9, 2010, 3 Pages of Office Action and 3 Pages of English Translation.

Office Action received for Japanese Patent Application No. 2006-547296, mailed on Jul. 10, 2012, 1 Page of Office Action only.

Office Action received for Japanese Patent Application No. 2006-547296, mailed on Aug. 25, 2009, 1 Page of Office Action and 2 Pages of English Translation.

Office Action received for Japanese Patent Application No. 2006-547296, mailed on Jan. 17, 2012, 5 Pages of Office Action and 5 Pages of English Translation.

Notice of Allowance received for Taiwan Patent Application No. 93140911, mailed on Apr. 27, 2007, 2 Pages of Notice of Allowance and 1 Page of English Translation.

Office Action received for Taiwan Patent Application No. 93140911, mailed on Dec. 6, 2006, 2 Pages of Office Action and 1 Page of English Translation.

Brofferio et al., "Performance Evaluation of Image Partitioned Processing on Transputer Network", Proceedings of the Lasted International Symposium, Applied Informatics, Feb. 1989, pp. 183-185.

Gangwal et al., "Understanding video pixel processing applications for flexible implementations", Proceedings of Digital System Design 2003, Sep. 1, 2003, pp. 392-401.

Intel, "Intel® MXP5800 Digital Media Processor Developer's Manual", Revision 2.0, Feb. 2003, pp. 1-290.

Kazuo, Yamada, "The development of real time image processing system", IEICE Technical Report, Nov. 2006, vol. 106, No. 393, pp. 21-26.

Kurdahi, F.J., "Reconfigurable computing: is it ready for industry", International Conference on Pervasive Services, Jul. 11-14, 2005, pp. 337-343.

Lippincott et al., "Architecture of the Intel® MXP5800 Digital Media Processor", Aug. 23, 2004, pp. 1-10. available at: <http://www.hotchips.org/wp-content/uploads/hc_archives/hc16/2_Mon/14_HC16_Sess3_Pres2_bw.pdf>.

International Preliminary Report on Patentability and Written Opinion received for PCT Patent Application No. PCT/US04/043080, mailed on Jul. 13, 2006, 10 Pages.

International Search Report and Written Opinion received for PCT Patent Application No. PCT/US04/043080, mailed on Oct. 18, 2005, 15 Pages.

International Preliminary Report on Patentability and Written Opinion received for PCT Patent Application No. PCT/US2004/016509, mailed on Dec. 19, 2005, 10 pages.

International Search Report and Written Opinion received for PCT Patent Application No. PCT/US2004/016509, mailed on Nov. 22, 2004, 14 pages.

Office Action received for European Patent Application No. 04753352.6, mailed on Aug. 19, 2008, 5 pages.

* cited by examiner

PROGRAMMABLE VIDEO PROCESSING AND VIDEO STORAGE ARCHITECTURE

CROSS-REFERENCE TO RELATED APPLICATIONS

The present patent application is a continuation patent application of U.S. patent application Ser. No. 10/750,544, filed Dec. 31, 2003, entitled "Programmable Video Processing and Video Storage Architecture," and invented by Louis A. Lippincott, which is incorporated by reference herein.

TECHNICAL FIELD

This invention relates generally to electronic data processing and more particularly, to a programmable video processing and video storage architecture.

BACKGROUND

A number of different electronic devices have been developed to assist viewers in recording and viewing of video. One such device that is increasing in demand is the digital video recorder that allows the user to pause live television, rewind, etc.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for a programmable video processing and video storage architecture are described. In the following description, numerous specific details are set forth. However, it is understood that embodiments of the invention may be practiced without these specific details. In other instances, well-known circuits, structures and techniques have not been shown in detail in order not to obscure the understanding of this description. While described with reference to processing and storage of video, embodiments of the invention are not so limited. For example, embodiments of the invention may include the processing and storage of audio, metadata that is part of the video and/or audio (e.g., close captioning, etc.), etc.

This detailed description is divided into two sections. In the first section, a hardware and operating environment are presented. In the second section, the operations of a programmable processing unit of a programmable video processing and video storage architecture are presented. Additionally, the first and second sections have been divided. The first section is divided into a description of a system, a description of a programmable processing unit, a description of a programmable processor, a description of a port ring and ports of a programmable processor and a description of the logical connections among the programmable processors. The second section is divided into a description of data transmission operations among the programmable processors and a description of multiple mode operations of the programmable processing unit.

Hardware and Operating Environment

In this section, a hardware and operating environment are presented.

System Description

Figure 1:
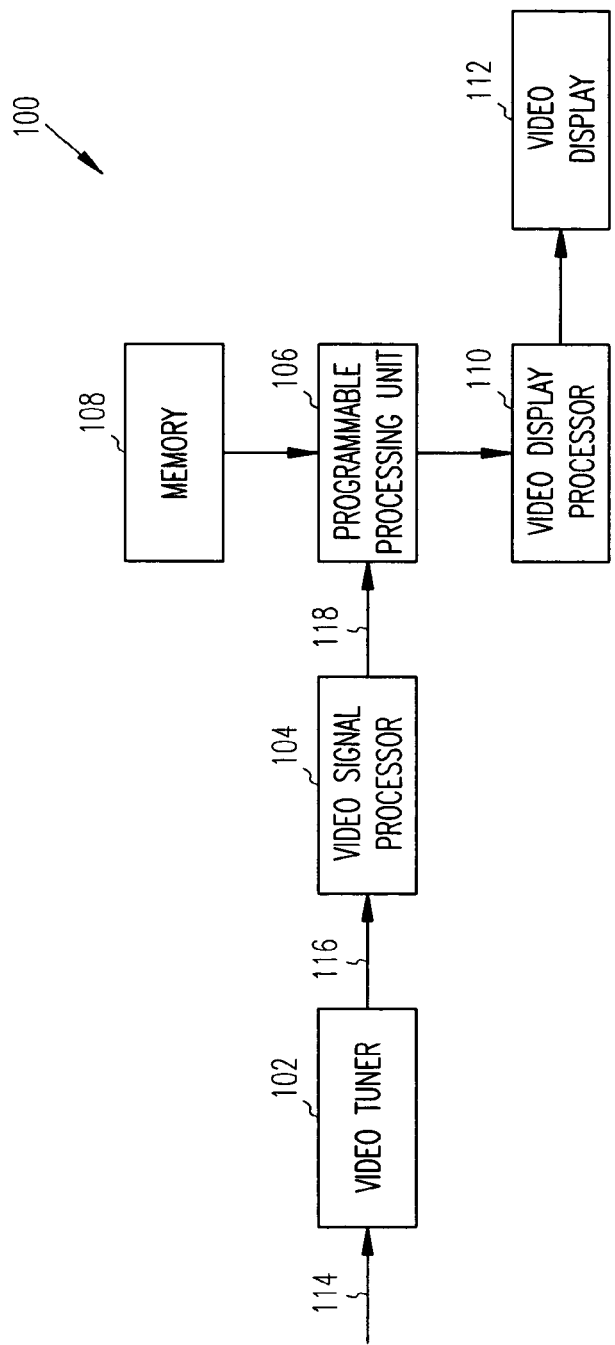
FIG. 1 illustrates a simplified block diagram of a system configuration that includes a programmable video processing and video storage architecture, according to one embodiment of the invention.

FIG. 1 illustrates a simplified block diagram of a system configuration that includes a programmable video processing and video storage architecture, according to one embodiment of the invention. As shown, FIG. 1 illustrates a system 100 that includes a video tuner 102, a video signal processor 104, a programmable processing unit 106, a memory 108, a video display processor 110 and a video display 112. In one embodiment, the system 100 can include components that may be within any of a number of different viewing devices, such as different types of televisions, computer monitors, etc. In another embodiment, parts of the components may be part of a set-top box, media center, etc. For example, the video tuner 102, the video signal processor 104, the programmable processing unit 106 and the memory 108 may be within a set-top box, while the video display processor 110 and the video display 112 are within a display device (e.g., a television). In an embodiment, the memory 108 can be different types of random access memory (RAM). For example, the memory 108 can be a Synchronous Dynamic RAM (SDRAM), DRAM, a double data rate (DDR) Synchronous Dynamic RAM (SDRAM), etc.

The video tuner 102 is coupled to the video signal processor 104. The video signal processor 104 is coupled to the programmable processing unit 106. The programmable processing unit 106 is coupled to the memory 108 and the video display processor 110. The video display processor 110 is coupled to the video display 112. The video tuner 102 is coupled to receive a signal 114. In an embodiment, the signal 114 is a Radio Frequency (RF) signal. The video tuner 102 receives the signal 114 and converts the signal 114 into an analog video signal 116 based on the channel that is currently selected for viewing on the video display 112.

The video signal processor 104 receives the analog video signal 116 and converts the analog video signal 116 into a digital video signal 118. In one embodiment, the video signal processor 104 filters the analog video signal 116 prior to conversion to the digital video signal 118. For example, the video signal processor 104 may filter the analog video signal 116 to remove noise from adjacent channels. In one embodiment, the video signal processor 104 filters the analog video signal 116 to remove noise from the audio signal. The digital video signal 118 may be a stream of data that can include sync signals for display on the video display 112.

The programmable processing unit 106 receives the digital video signal 118. As will be further described below, in an embodiment, the programmable processing unit 106 performs different operations depending on the current mode of the system 100. In one such embodiment, the programmable processing unit 106 operates in one of two modes: 1) a storage mode and 2) an image processing mode. In the storage mode, the user of the system 100 may be saving or replaying video that has been received into the system 100. In an embodiment, the programmable processing unit 106 stores the video into the memory 108. To illustrate, assume that the system 100 is part of a television. The user may save video being received on the signal 114. For example, the user may pause the video being displayed on the video display 112 for a given period of time. Additionally, in the storage mode, the user may replay the video that is displayed on the video display 112, thereby causing storage of the incoming video to be stored into the memory 108.

In an embodiment, if the user is not placing the programmable processing unit 106 into the storage mode, the programmable processing unit 106 is in the image processing mode. In one embodiment, the programming processing unit 106 remains in the storage mode until the memory 108 does not include stored video for display. The image processing mode can be enabled when a user is not attempting to replay video that is saved within the memory 108 or when a user is not attempting to save video into the memory 108 that is being received into the system 100. As further described below, in one such embodiment, the programmable processing unit 106 performs enhanced video processing on the incoming video signal. Such enhancement may include reduction of ghosting, noise, dot-crawl, etc. The programmable processing unit 106 may use the memory 108 to store multiple frames of the incoming video. Accordingly, the programmable processing unit 106 may perform enhancement of the image across a number of frames. For example, the programmable processing unit 106 may perform temporal noise reduction across a number of frames. The programmable processing unit 106 and the operations therein are described in more detail below.

The video display processor 110 receives the video from the programmable processing unit 106 and may perform a number of operations on the video for display on the video display 112. For example, the video display processor 110 may adjust the video based on tint settings, contrast settings, etc. The video display 112 is coupled to receive the signal from the video display processor 110. While the video display 112 may be a number of different types of displays, in one embodiment, the video display 112 may be a cathode ray tube (CRT), a plasma display, a liquid crystal display (LCD), etc.

Accordingly, embodiments of the invention include a flexible programmable architecture to provide alternative functionality based on the mode of operation. Such functionality includes operations of a digital video recorder and operations that allow for enhanced image processing of the video. Therefore, display devices that incorporate embodiments of the invention may offer the ability to rewind, pause, fast forward and play for a given channel of as well as improved image quality of the broadcasted content.

Description of a Programmable Processing Unit

Figure 2:
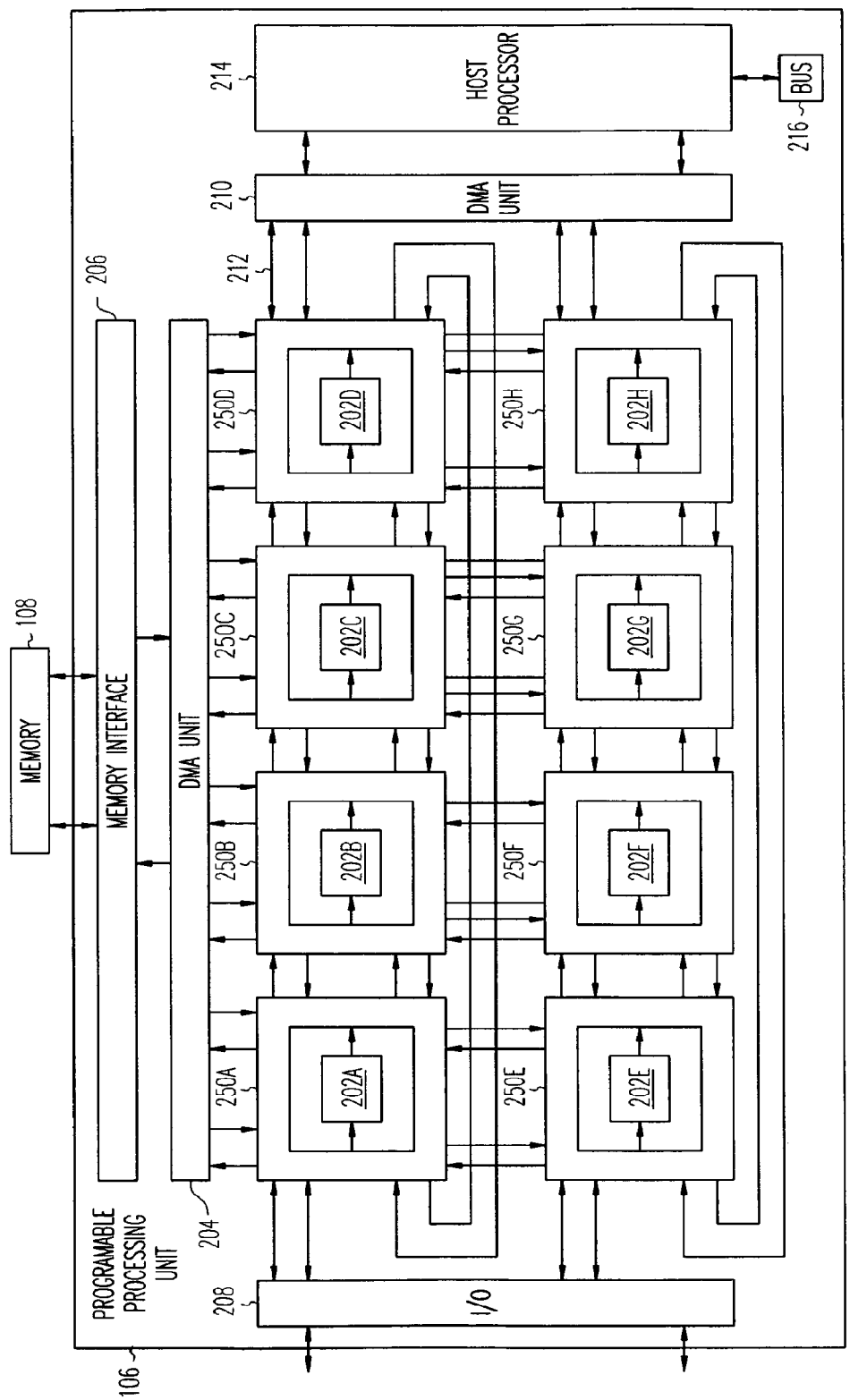
FIG. 2 illustrates a more detailed block diagram of a programmable processing unit, according to one embodiment of the invention.

One embodiment of the programmable processing unit 106 is now described. In particular, FIG. 2 illustrates a more detailed block diagram of a programmable processing unit, according to one embodiment of the invention. As shown, the programmable processing unit 106 includes programmable processors 202A-202H. The programmable processors 202A-202H include port rings 250A-250H, respectively. As further described below, the port rings 250A-250H include a number of ports through which the programmable processors 202A-202H transmit interface (control and data) signals. In an embodiment, a given port ring 250 includes eight I/O ports, wherein each such I/O port is a bi-directional connection such that data can be sent and received simultaneously through two separate unidirectional data buses. In other words, an I/O port includes a transmitter port and a receiver port.

The programmable processing unit 106 also includes a Direct Memory Access (DMA) unit 204, a DMA unit 210, a memory interface 206, an input/output (I/O) interface 208, and a host processor 214. While FIG. 2 illustrates eight programmable processors 202, embodiments are not so limited, as a greater and/or a lesser number of such elements may be incorporated into embodiments of the programmable processing unit 106. In one embodiment, the host processor 214 may be different types of general purpose processors. The I/O interface 208 provides an interface to I/O devices or peripheral components for the programmable processing unit 106. The I/O interface 208 may comprise any suitable interface controllers to provide for any suitable communication link to different components of the programmable processing unit 106. The I/O interface 208 for one embodiment provides suitable arbitration and buffering for one of a number of interfaces.

As shown, the interconnections among the programmable processors 202A-202H provides for a point-to-point nearest neighbor configuration, wherein a given programmable processor 202 is physically connected to four other elements (e.g., a different programmable processor 202, the DMA unit 204) within the programmable processing unit 106. In other words, a given programmable processor 204 is not physically connected to every other programmable processor 204 within the programmable processing unit 106. As further described below, data may be transmitted from a source programmable processor 202 to a destination programmable processor 202 through a series of intermediate programmable processors 202. In an embodiment, the transmission through the series of intermediate programmable processors 202 is such that the data is received on a receiver port of the intermediate programmable processor 202 and is outputted on a transmitter port of the intermediate programmable processor 202 through the port ring 250. Accordingly, no processor elements within the intermediate programmable processor 202 perform a process operation on the data as part of the transmission of the data from the source to the destination programmable processor 202.

Through the port ring 250A, the programmable processor 202A is coupled to the I/O interface 208 through two I/O ports and is coupled to the port ring 250D of the programmable processor 202D through a different I/O port. Through the port ring 250A, the programmable processor 202A is coupled to the DMA unit 204 through two other different I/O ports. Through the port ring 250A, the programmable processor 202A is also coupled to the port ring 250B of the programmable processor 202B through two more different I/O ports. Further, through the port ring 250A, the programmable processor 202A is coupled to the port ring 250E of the programmable processor 202E through two other I/O ports.

Through the port ring 250B, the programmable processor 202B is coupled to the DMA unit 204 through two different I/O ports. Through the port ring 250B, the programmable processor 202B is also coupled to the port ring 250C of the programmable processor 202C through two other different I/O ports. Through the port ring 250B, the programmable processor 202B is coupled to the port ring 250F of the programmable processor 202F through two more different I/O ports.

Through the port ring 250C, the programmable processor 202C is coupled to the DMA unit 204 through two different I/O ports. Through the port ring 250C, the programmable processor 202C is also coupled to the port ring 250D of the programmable processor 202D through two other different I/O ports. Through the port ring 250C, the programmable processor 202C is coupled to the port ring 250G of the programmable processor 202G through two more different I/O ports.

Through the port ring 250D, the programmable processor 202D is coupled to the DMA unit 204 through two different I/O ports. Through the port ring 250D, the programmable processor 202D is also coupled to the DMA unit 210 through two I/O ports and is coupled to the port ring 250A of the programmable processor 202A through a different I/O port. Through the port ring 250D, the programmable processor 202D is coupled to the port ring 250H of the programmable processor 202H through two more different I/O ports.

Through the port ring 250E, the programmable processor 202E is coupled to the I/O interface 208 through two I/O port and is coupled to the port ring 250H of the programmable processor 202H through a different I/O port. Through the port ring 250E, the programmable processor 202E is also coupled to the port ring 250F of the programmable processor 202F through two more different I/O ports. Further, through the port ring 250E, the programmable processor 202E is coupled to the port ring 250A of the programmable processor 202A through two other I/O ports.

Through the port ring 250F, the programmable processor 202F is coupled to the port ring 250G of the programmable processor 202G through two other different I/O ports. Through the port ring 250F, the programmable processor 202F is coupled to the port ring 250B of the programmable processor 202B through two more different I/O ports.

Through the port ring 250G, the programmable processor 202G is coupled to the port ring 250H of the programmable processor 202H through two different I/O ports. Through the port ring 250G, the programmable processor 202G is coupled to the port ring 250C of the programmable processor 202C through two more different I/O ports.

Through the port ring 250H, the programmable processor 202H is also coupled to the DMA unit 212 through two I/O ports and is coupled to the port ring 250E of the programmable processor 202E through a different I/O port. Through the port ring 250H, the programmable processor 202H is coupled to the port ring 250D of the programmable processor 202D through two more different I/O ports.

The I/O interface 208 may also be externally coupled to different external devices. In an embodiment, the I/O interface 208 is externally coupled to receive the digital video signal 118 from the video signal processor 104 and is externally coupled to transmit the digital video signal 118 to the video display processor 110. In one embodiment, the I/O interface 208 may be externally coupled to other programmable processing units 106, thereby allowing for the expansion of the number of programmable processors 202 that can communicate and process image data together. In one embodiment, a number of the programmable processing units 106 may be daisy-chained together to allow for the processing of data across a number of different programmable processing units 106.

The DMA unit 204 is coupled to the memory interface 206. The memory interface 206 is coupled to the memory 108. As will be described in more detail below, data (such as output from a result of a process operation from one of the programmable processors 202) can be stored into and read from the memory 108 through the DMA unit 204 and the memory interface 206.

The host processor 214 is coupled to an internal global bus 216. Although not shown in FIG. 2, the internal global bus 216 is coupled to the different elements within the programmable processing unit 106. Accordingly, the host processor 214 may directly communicate with/configure each of the different elements within the programmable processing unit 106.

Description of a Programmable Processor

Figure 3:
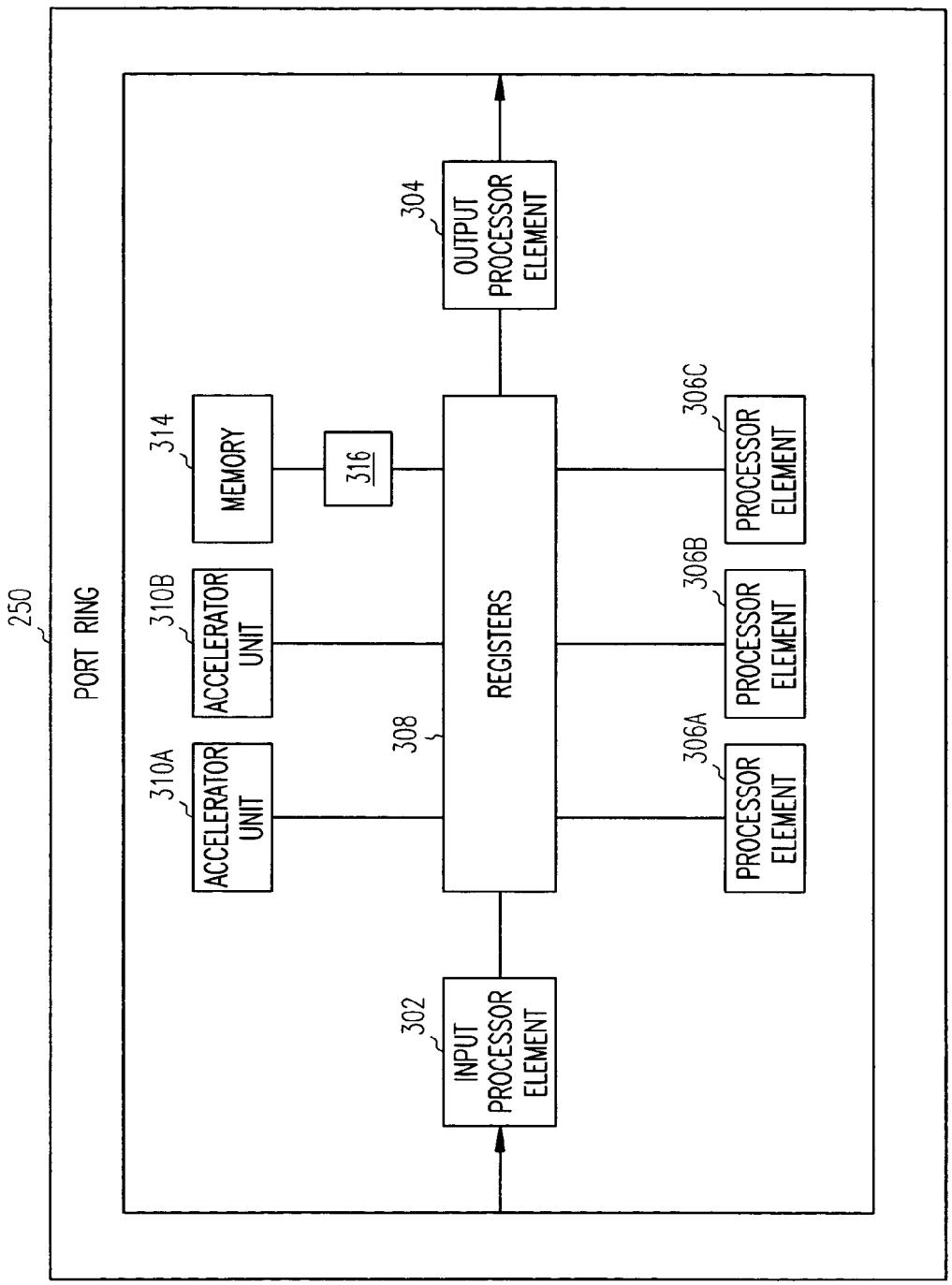
FIG. 3 illustrates a more detailed block diagram of programmable processor, according to one embodiment of the invention.

FIG. 3 illustrates a more detailed block diagram of programmable processor, according to one embodiment of the invention. In particular, FIG. 3 illustrates a more detailed block diagram of one of the programmable processors 202, according to one embodiment of the invention.

The programmable processor 202 includes an input processor element 302, an output processor element 304, a number of processor elements 306A-306C, a number of registers 308, a number of accelerator units 310A-310B, a memory 314 and a memory controller 316. The input processor element 302, the output processor element 304, the processor elements 306A-306C, the accelerator units 310A-310B and the memory 314 (through the memory controller 316) are coupled to the registers 308. The registers 308 allow the processor elements 302, 304 and 306, the accelerator units 310A-310B and the memory 314 to exchange data and can be used as general purpose registers for a given processor element 302, 304 and 306 and the accelerator units 310A-310B. Moreover, the processor elements 302, 304 and 306 and the accelerator units 310A-310B may include a number of local registers (not shown).

In an embodiment, the input processor element 302, the output processor element 304 and the processor elements 306A-306C include an instruction memory and an arithmetic-logic unit (ALU) for processing of the data. The input processor element 302 and the output processor element 304 are coupled to the ports of the programmable processor 202 through the port ring 250 to receive data being inputted into and to transmit data being outputted from, respectively, the programmable processor 202 (which is described in more detail below in conjunction with FIGS. 4-9). In addition to inputting and outputting of data, the input processor element 302 and/or the output processor element 304 may process the data (similar to the processing provided by the processor elements 306A-306C). The different processor elements 306A-306C may be general purpose processor elements or special purpose processor elements. For example, the processor elements 306A-306C may be Multiply-Accumulate (MAC) processor elements that include an instruction set for general purpose processing as well as an instruction set for MAC functionality. The processor elements 306A-306C may be a combination of general purpose processor elements and special purpose processor elements. For example, the processor elements 306A and 306C may be MAC processor elements, while the processor elements 306B may be a general purpose processor element. While FIG. 3 illustrates five processor elements within the programmable processor 202, in other embodiments, a lesser or greater number of such processor elements may be incorporated into the programmable processor 202.

The input processor element 302 is a general purpose processor element with a port interface as an input port. In an embodiment, the instructions within the input processor element 302 have the ports as additional input operands along with the registers 308 and the local registers within the input processor element 302. The output processor element 304 is a general purpose processor element with a port interface as an output port. In an embodiment, the instructions within the output processor element 304 have the ports as additional output operands along with the registers 308 and the local registers within the output processor element 304.

Port Ring and Ports of a Programmable Processor

Figure 4:
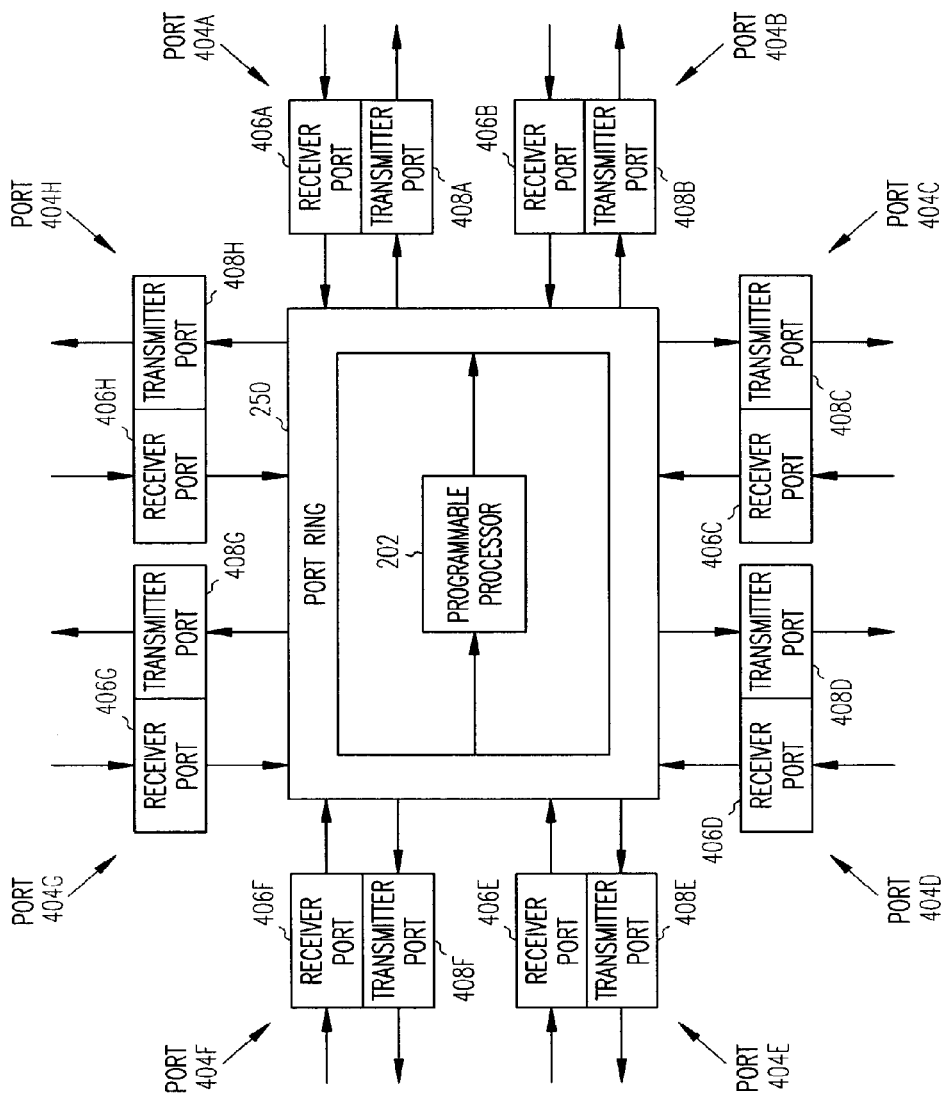
FIG. 4 illustrates a port ring and associated ports of a programmable processor, according to one embodiment of the invention.

FIG. 4 illustrates a port ring and associated ports of a programmable processor, according to one embodiment of the invention. The programmable processor 202 is coupled to input and output data to and from ports 404A-404H through the port ring 250. As shown, in an embodiment, the ports 404A-404H are bi-directional data connections that allow for data to flow from one programmable processor 202 to a different unit (such as a different programmable processor 202, the DMA unit 204, the I/O interface 208).

A given port 404A-404H comprises a receiver port and a transmitter port for receiving data into and transmitting data out from the port 404, respectively. In particular, the ports 404A-404H include receiver ports 406A-406H and transmitter ports 408A-408H, respectively. An embodiment of a receiver port and an embodiment of a transmitter port are described below in conjunction with FIG. 6 and FIG. 7, respectively. In an embodiment, the programmable processor 202 is connected to adjacent (nearest neighbor) programmable processors 202 (as illustrated in FIG. 2) through the ports 404A-404H.

Figure 5:
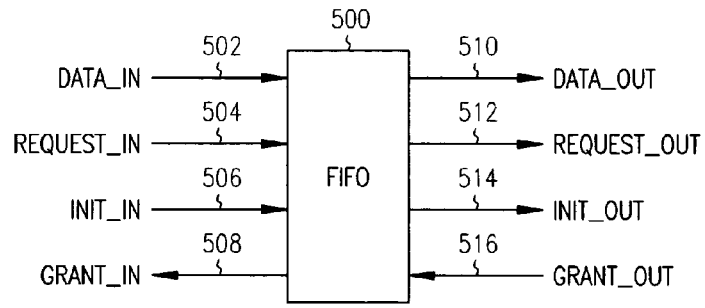
FIG. 5 illustrates a FIFO memory within a transmitter or receiver port and associated interface signals for the memory, according to one embodiment of the invention.

One embodiment of receiver and transmitter port (within one of the ports 404) which includes FIFO memories will now be described. FIG. 5 illustrates a FIFO memory within a transmitter or receiver port and associated interface signals for the memory, according to one embodiment of the invention.

As shown, a FIFO memory 500 receives an init_in signal 506 and transmits an init_out signal 510, which (as described in more detail below) are control signals for initialization and generation of a logical connection that is used to transmit data through the different programmable processors 202. The FIFO memory 500 receives a data_in signal 502 that inputs data into one of the entries of the FIFO memory 500.

The FIFO memory 500 also illustrates a number of grant/request signals. As is further described below, in an embodiment, the ports 404 use a handshake protocol for the transmission of data based on these grant/request signals. Accordingly, this grant/receive protocol allows for a data driven architecture, wherein the image process operations are driven by the data on which such operations execute.

The FIFO memory 500 receives a request_in signal 504, which is a control signal from a FIFO memory in a different port that inputs data into an entry of the FIFO memory 500. The FIFO memory 500 transmits a grant_in signal 508 to this FIFO memory, in response to the request_in signal 504, that indicates that this FIFO memory may transmit data into the FIFO memory 500.

The FIFO memory 500 transmits a request_out signal 512 to a FIFO memory of a different port to request the transmission of data from the FIFO memory 500 to this FIFO memory. The FIFO memory 500 receives a grant_out signal 516 from this FIFO memory, in response to the request_out signal 512. This grant_out signal 516 signals to the FIFO memory 500 that the different FIFO memory will receive data from the FIFO memory 500. The FIFO memory 500 transmits a data_out signal 510 that transmits data to the different FIFO memory that granted transmission of the data (through grant_out signal 516) in response to the request_out signal 512.

Figure 6:
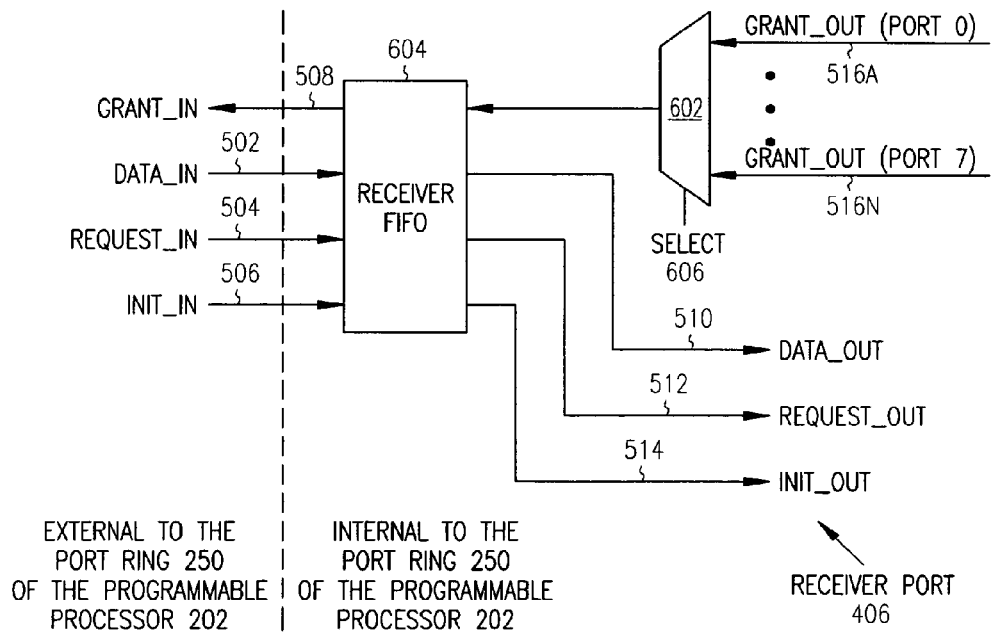
FIG. 6 illustrates a more detailed block diagram of a receiver port along with associated interface signals, according to one embodiment of the invention.

FIG. 6 illustrates a more detailed block diagram of a receiver port along with associated interface signals, according to one embodiment of the invention. In particular, FIG. 6 illustrates one embodiment of a receiver port 406 (that includes a receiver FIFO 604) and associated interface signals. The receiver port 406 is within one of the ports 404 (shown in FIG. 4) and receives data into the programmable processor 202.

The receiver FIFO 604 is coupled to receive and transmit interface signals (the grant_in signal 508, the data_in signal 502, the request_in signal 504 and the init_in signal 506) to and from a transmitter port 408 that is external to the port ring 250 of the programmable processor 202. The receiver FIFO 604 is also coupled to receive and transmit interface signals (a number of grant_out signals 516A-516N, the data_out signal 510, the request_out signal 512 and the init_out signal 514) from transmitter ports 408 that are internal to the port ring 250 of the programmable processor 202 or a processor element within the programmable processor 202. As shown, the grant_out signals 516A-516N are received into a multiplexer 602. The receiver port 406 uses a select signal 606 to cause the multiplexer 602 to select one of the grant_out signals 516A-516N to be inputted into the receiver FIFO 604. As described above, the host processor 214 configures the programmable processors 1202, wherein output from one processor element in a programmable processor 202 may be input to be processed by a different processor element in a different programmable processor 202 through a logical connection. Accordingly, the host processor 214 causes the receiver port 406 to assert the select signal 606 to select the grant_out signal 516 from the appropriate transmitter port 408/input processor element 302.

As described, the output from a first process operation in a first programmable processor 202 may be forwarded to a second programmable processor 202, wherein a second process operation is performed. In one embodiment, this output is transmitted through a logical connection that comprises a number of ports 404 of a number of programmable processors 202. In an embodiment, an initialize signal is transmitted through the different ports 404 through which the data is transmitted for a given logical connection. As described above, the architecture of the programmable processing unit 106 is such that a given programmable processor 202 is not directly connected to every other programmable processor 202. Rather, a programmable processor 202 is connected to adjacent (nearest neighbor) devices. Therefore, if data is to be transmitted from one programmable processor 202 to another programmable processor 202, a logical connection is established through different ports of the different programmable processors 202 that the data traverses from the source programmable processor 202 to the destination programmable processor 202.

Returning to FIG. 2 to illustrate, assume that the output from a processor element within the programmable processor 202C is to be transmitted to a processor element within the programmable processor 202E for further processing. One of a number of logical connections may be established from the programmable processor 202C to the programmable processor 202E. One example of a logical connection is from the programmable processor 202C to the programmable processor 202B to the programmable processor 202A to the programmable processor 202E. A different example of a logical connection is from the programmable processor 202C to the programmable processor 202G to the programmable processor 202F to the programmable processor 202E. In one embodiment, the host processor 214 determines the selection of the logical connection based on the other active logical connections that may be using the same paths of communication. For example, if other logical connections are using the ports between the programmable processor 202B to the programmable processor 202A, the host processor 214 may select the latter example logical connection to reduce the latency for the data processing operations.

In an embodiment, the port 404 from which the data originates is initialized. This initialization signal will be propagated through the entire logical connection, thereby initializing the data path for this given logical connection. This initialization signal is registered and passed through the different ports 404 as if the initialization signal were the data in order to prevent the propagation delays from accumulating through long logical connections. In an embodiment, this initialization may include flushing of the receiver and transmitter FIFOs that are used in the logical connection. Therefore, if any data is within these FIFOs from a previous logical connection, this initialization causes the data to be deleted therefrom. In an embodiment, these different interface signals are handled in this manner to preclude large combinatorial delays through the logical connections. Therefore, routing between the different programmable processors 202 are processed through point-to-point connections that are registered in the different ports 404 that are part of the logical connection.

Figure 7A:
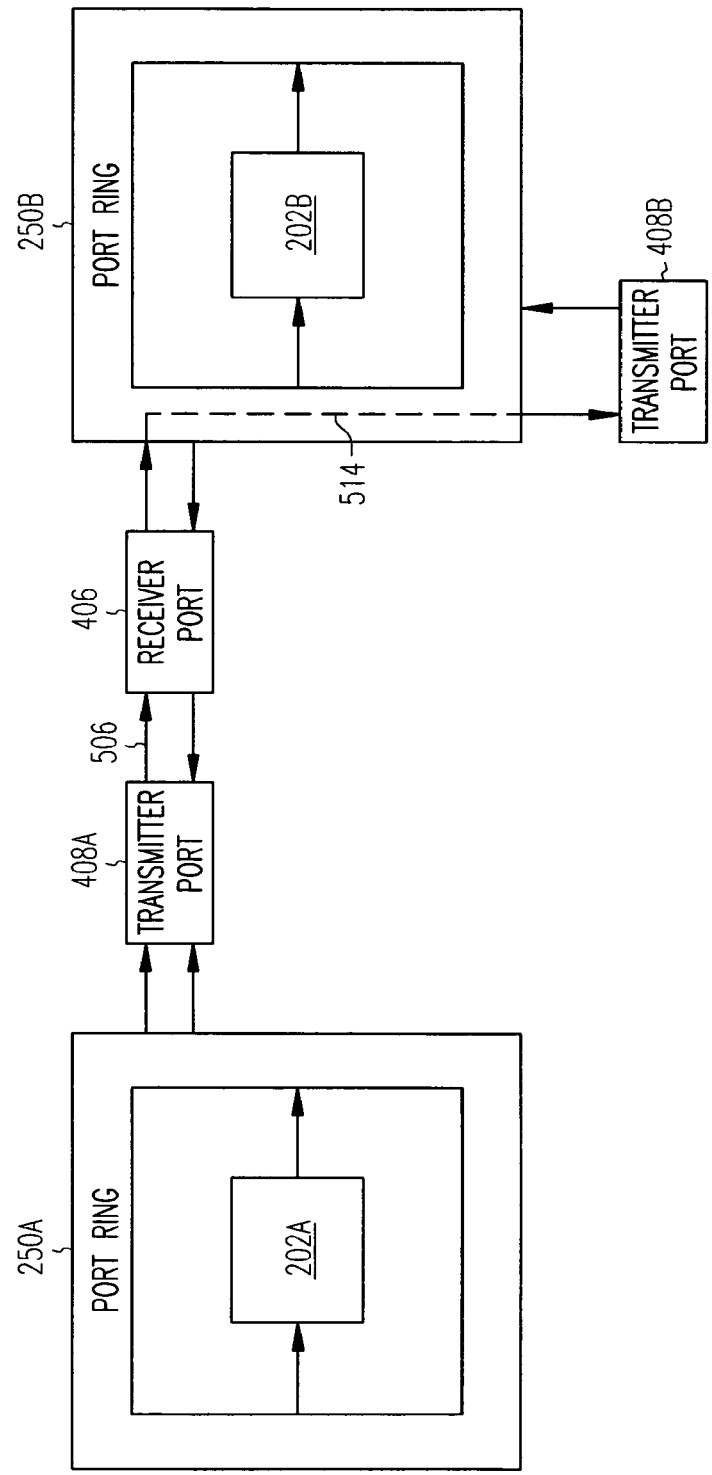
FIGS. 7A-7G illustrate a more detailed block diagram of a receiver port communicating with different transmitter ports, according to one embodiment of the invention.
Figure 7B:
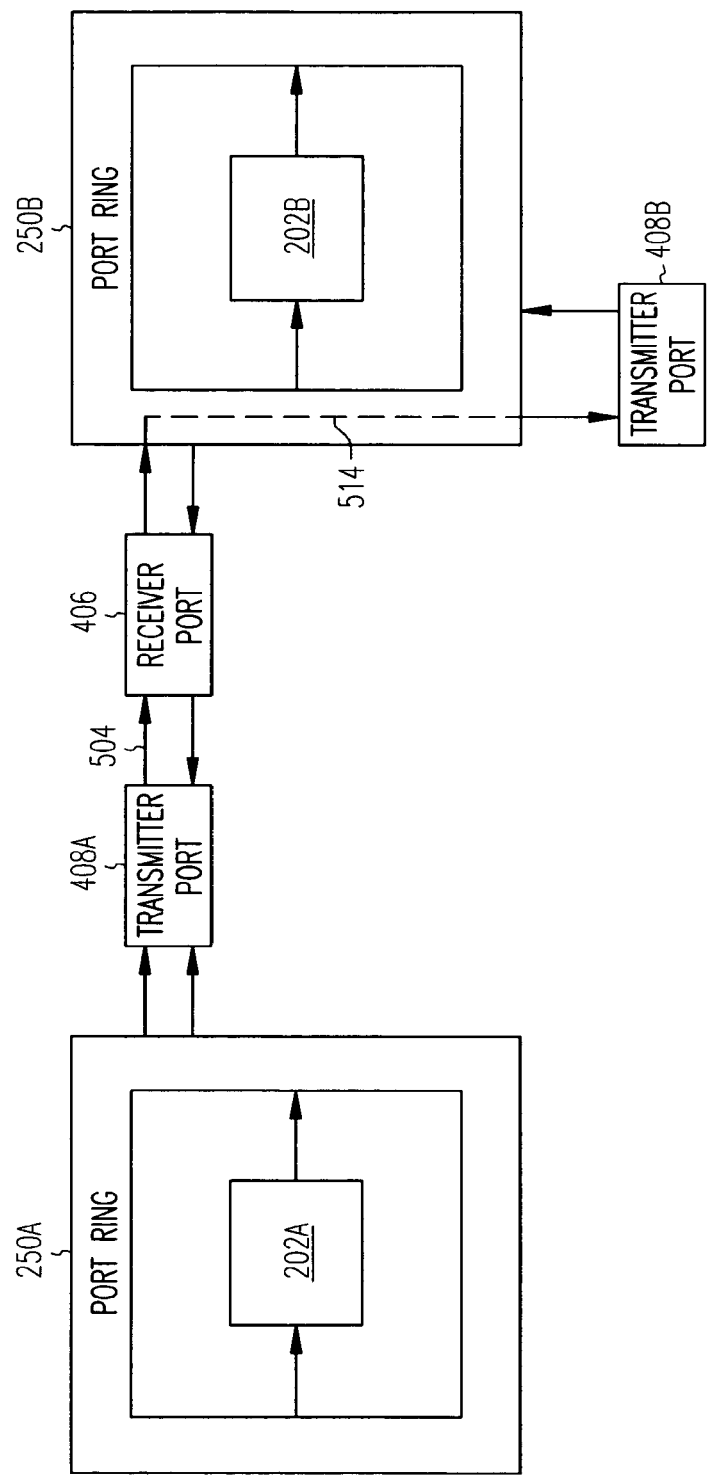
Figure 7C:
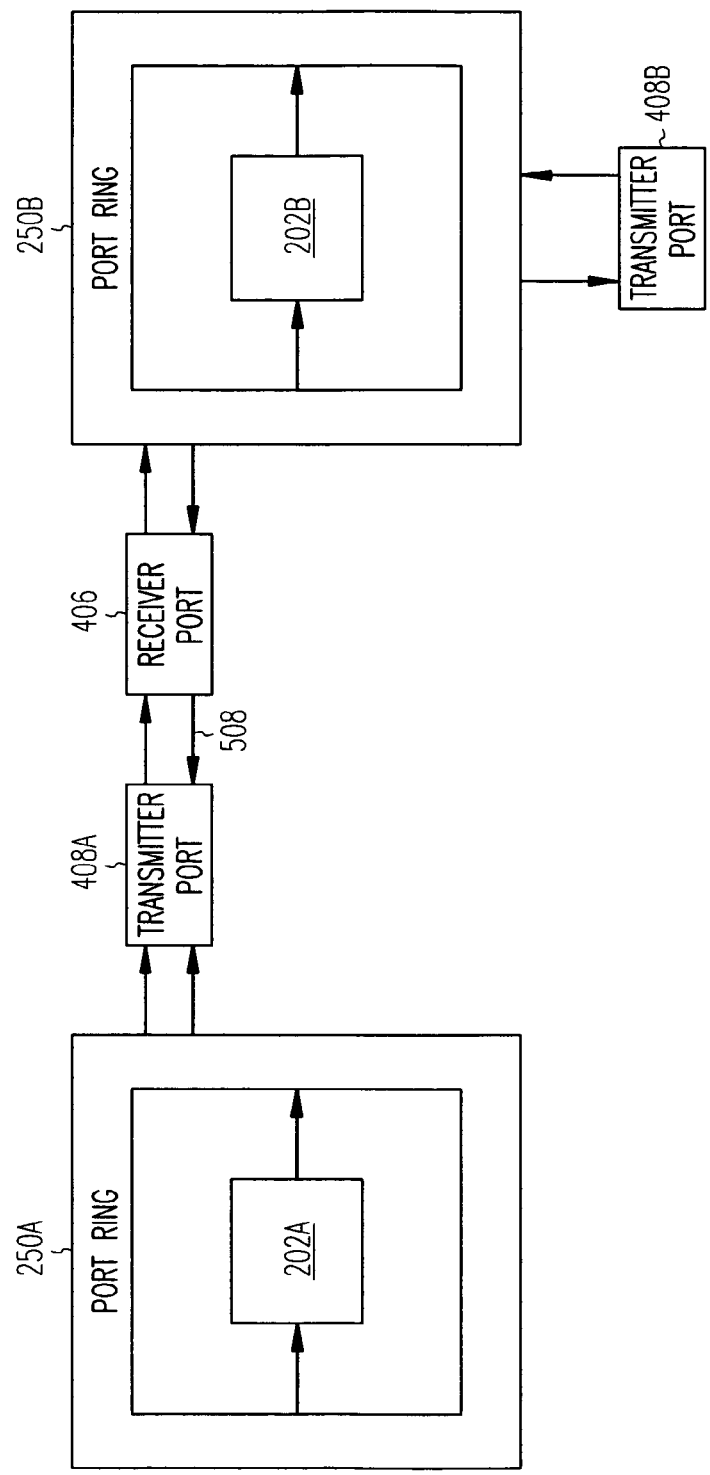
Figure 7D:
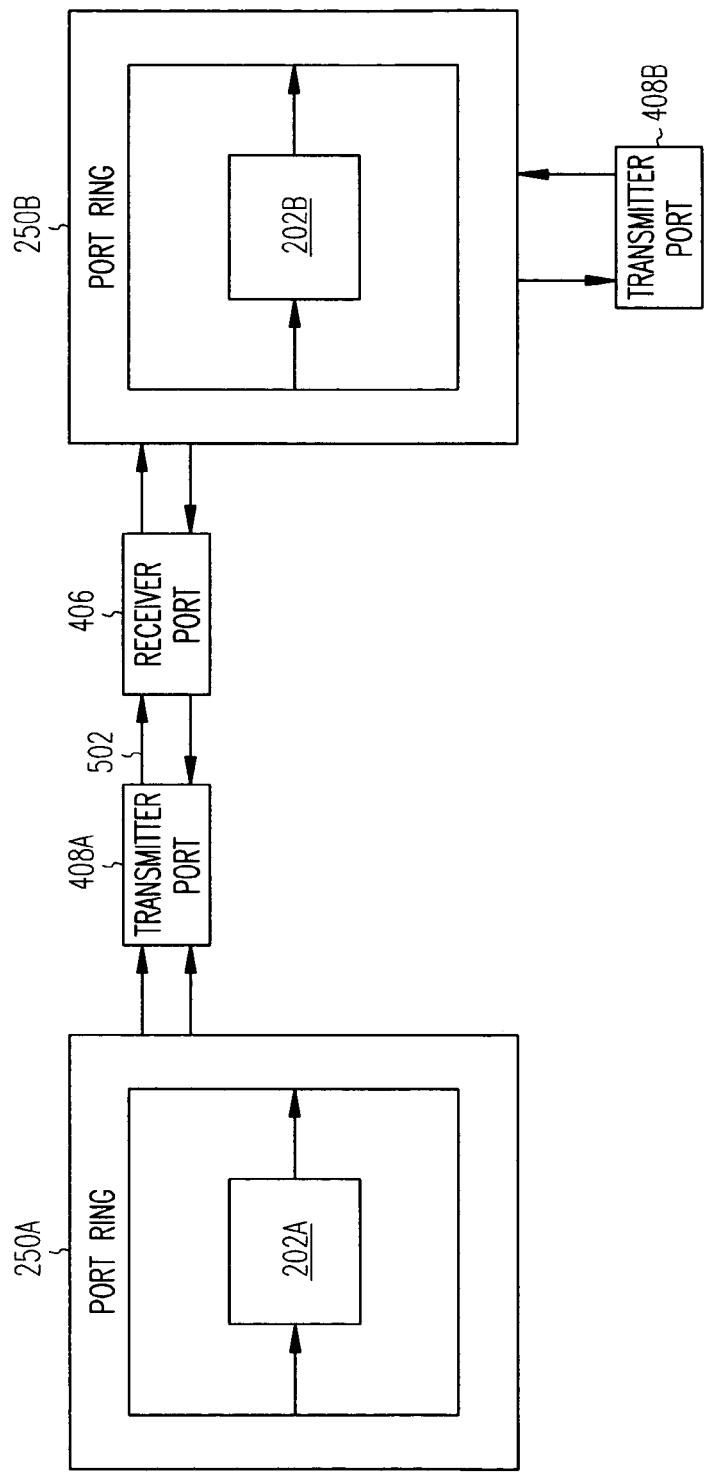
Figure 7E:
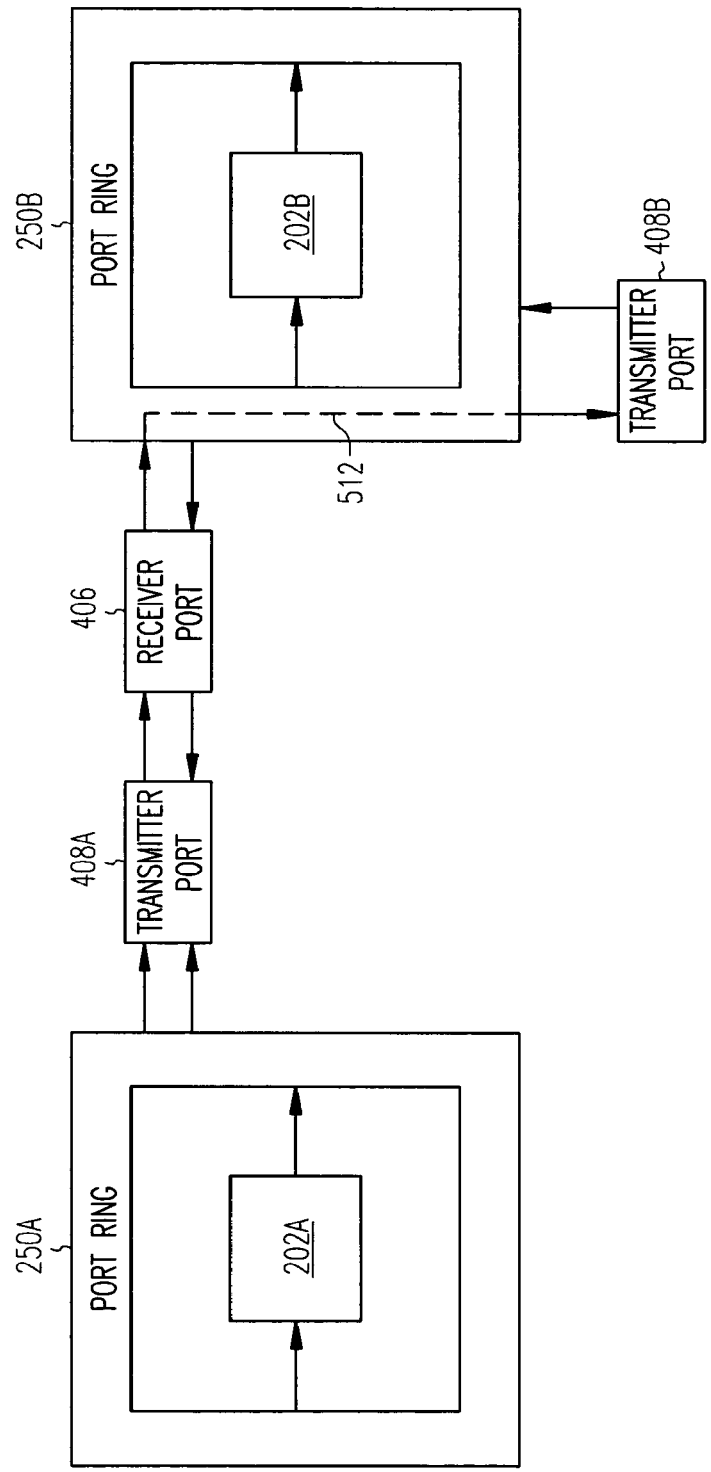
Figure 7F:
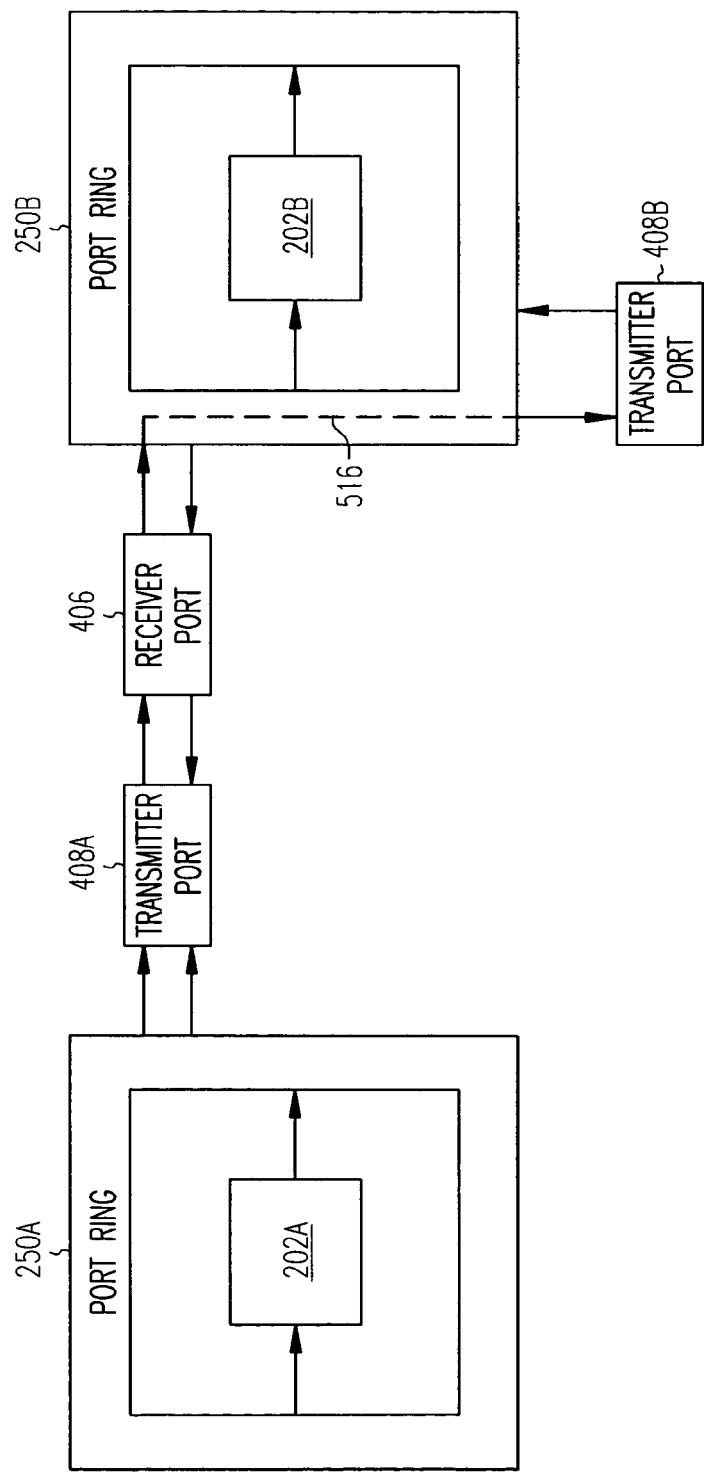
Figure 7G:
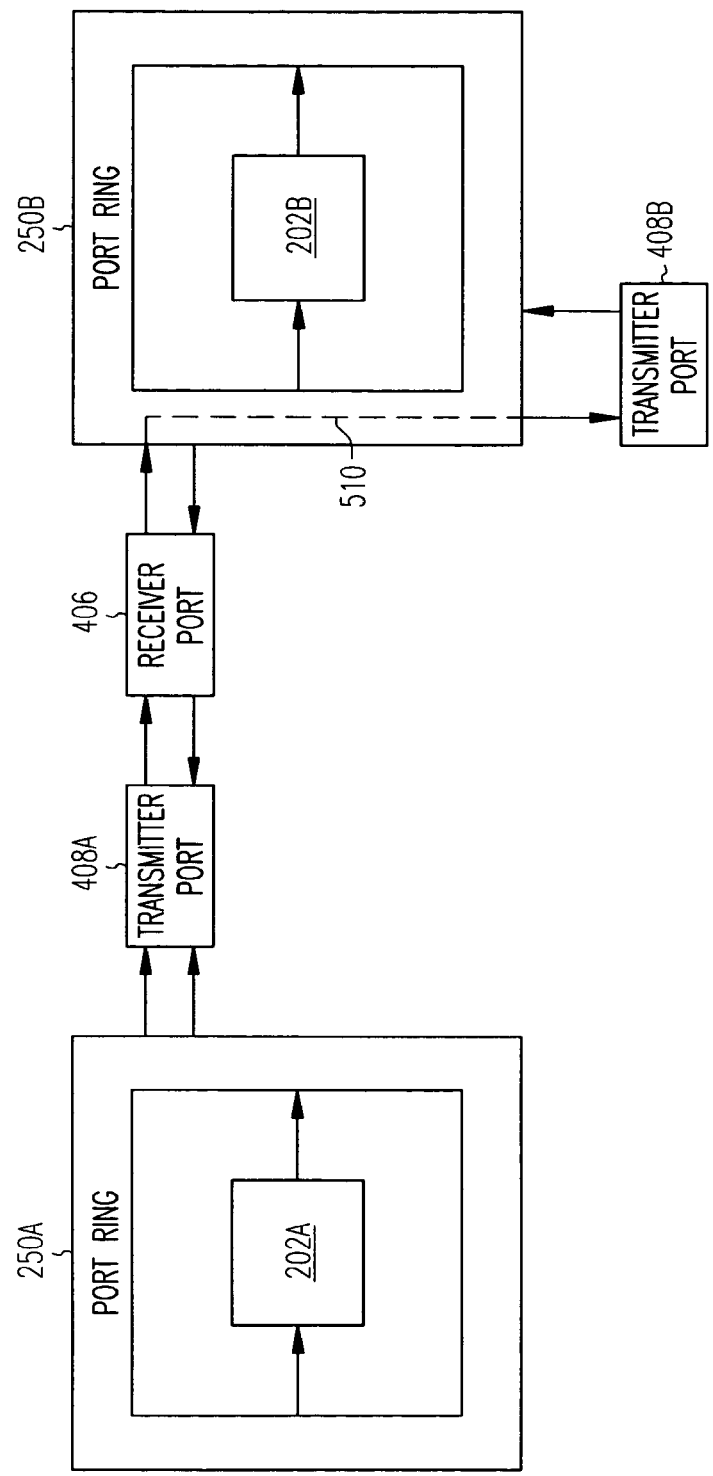

To illustrate, FIGS. 7A-7G illustrate a more detailed block diagram of a receiver port communicating with different transmitter ports, according to one embodiment of the invention. In particular, FIGS. 7A-7D illustrate a more detailed block diagram of the receiver port 406 communicating with the transmitter port 408A that is external to the port ring 250B. FIGS. 7E-7G illustrate a more detailed block diagram of the receiver port 406 communicating with the transmitter port 408B that is internal to the port ring 250B.

FIGS. 7A-7G illustrate the programmable processor 202A and the programmable processor 202B. The programmable processor 202A and the programmable processor 202B include the port ring 250A and the port ring 250B, respectively. Additionally, the programmable processors 202A-202B include a number of receiver and transmitter ports. In particular, a given port 404 (shown in FIG. 4) includes a transmitter port and a receiver port. However, for the sake of clarity, FIGS. 7A-7G illustrate either a transmitter port or receiver port for a given port 404. The port ring 250A of the programmable processor 202A includes the transmitter port 408A. The port ring 250B of the programmable processor 202B includes the receiver port 406 and the transmitter port 408B.

FIG. 7A illustrates that the transmitter port 408A transmits the init_in signal 506 to the receiver port 406 to flush the FIFOs that are part of the logical connection (between itself and the receiver port 406). Furthermore, FIG. 7A illustrates that the receiver port 406 forwards this initialization through the logical connection, as the init_out signal 514 to the transmitter port 408B through the port ring 250B. Accordingly, part of the logical connection includes the transmitter port 408A, the receiver port 406 and the transmitter port 408B. This logical connection may include a number of other programmable processors 202. Therefore, this initialization may have been received by the transmitter port 408A from a different programmable processor 202 through one of the internal receiver ports 406 of the port ring 250A. Additionally, the transmitter port 408B may forward this initialization may to another programmable processor 202. Once the initialization of the logical connection is complete, data may be transmitted through this logical connection.

FIG. 7B illustrates that the transmitter port 408A uses the request_in signal 504 to request the inputting of data into the receiver port 406. FIG. 7C illustrates that, in response to the request_in signal 504, and after storage is available in the receiver FIFO 604 of the receiver port 406, the receiver port 406 uses the grant_in signal 508 to indicate to the transmitter port 408A that the transmitter port 408A may transmit data into the receiver port 406. FIG. 7D illustrates that the transmitter port 408A uses the data_in signal 502 to transmit data for storage into the receiver FIFO 604 of the receiver port 406 when the request_in signal 504 and the grant_in signal 516 are active on the active edge of the clock signal controlling the programmable processing unit 106.

Additionally as shown in FIG. 6, the receiver port 406 transmits and receives interface signals from a transmitter port 408B which are both part of a same port ring 250. FIGS. 7E-7G illustrate such communications.

FIG. 7E illustrates that the receiver port 406 uses the request_out signal 512 to request the inputting of data into the transmitter port 408B (one of the internal transmitter ports of the port ring 250B). FIG. 7F illustrates that, in response to the request_out signal 512, the transmitter port 408B transmits the grant_out signal 516 back to the receiver port 406. FIG. 7G illustrates that the receiver port 406 uses the data_out signal 510 to transmit the data to the transmitter port 408B when the request_out signal 512 and the grant_out signal 516 are active on the active edge of the clock signal controlling the programmable processing unit 106.

Furthermore, although not shown in FIGS. 7E-7G, the receiver port 406 may transmit/receive these interfaces signals (the request_out signal 512, the grant_out signal 516 and the data_out signal 510) to/from the input processor element 302 (illustrated within FIG. 3) for the programmable processor 202B. If the data within the receiver FIFO 604 is to be inputted to one of the processor elements (the input processor element 302, the output processor element 304 and/or the processor elements 306A-306C) within this programmable processor 202 for processing therein, the receiver port 406 transmits the request_out signal 512 to the input processor element 302. If the data within the receiver port 406 is to be transmitted to a device external to the programmable processor 202 (e.g., a different programmable processor 202, one of the DMA units 204 or one of the external interfaces 208), the receiver port 406 transmits the request_out signal 512 to the appropriate transmitter port 408 (the port that is part of the logical connection).

Figure 8:
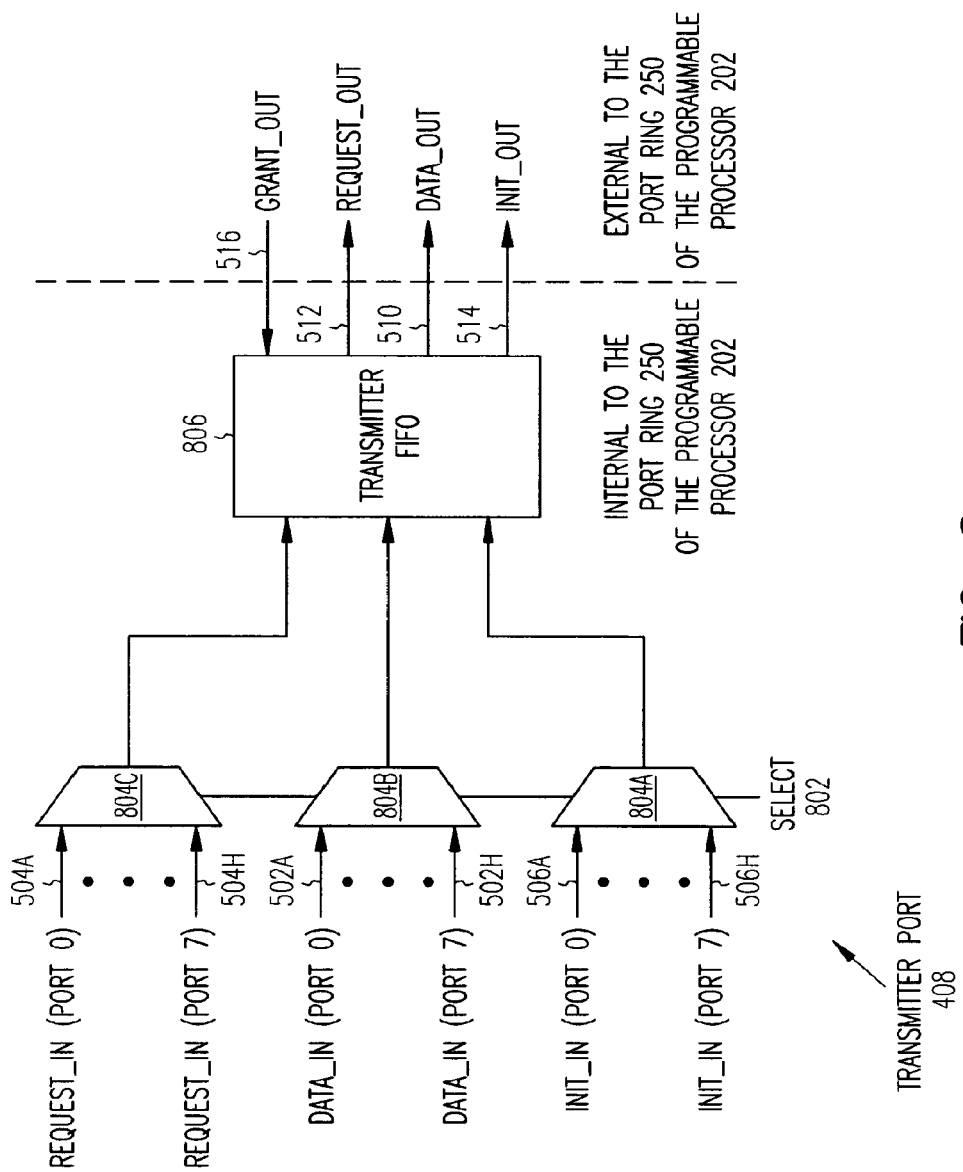
FIG. 8 illustrates a more detailed block diagram of a transmitter port along with associated interface signals, according to one embodiment of the invention.

FIG. 8 illustrates a more detailed block diagram of a transmitter port along with associated interface signals, according to one embodiment of the invention. In particular, FIG. 8 illustrates one embodiment of the transmitter port 408 (which includes a transmitter FIFO 806) and associated interface signals. The transmitter port 408 is within one of the ports 404 (shown in FIG. 4) and is to transmit data out from the programmable processor 202.

As shown, a number of the init_in signals 506A-506H, a number of the data_in signals 502A-502H and a number of the request_in signals 504A-504H are inputted into the transmitter port 408 from one of the receiver ports 406 that are internal to this programmable processor 202 (i.e., that are internal to the port ring 250 of the programmable processor 202). Additionally, the grant_out signal 516, the request_out signal 512, the data_out signal 510 and the init_out signal 514 are outputted from the transmitter port 408 to receiver ports 406 that are external to the port ring 250 for this programmable processor 202.

The transmitter FIFO 806 is coupled to receive interface signals (the number of the init_in signals 506A-506H, the number of the data_in signals 502A-502H and the number of the request_in signals 504A-504H) through a multiplexer 804A, a multiplexer 804B and a multiplexer 804C, respectively, from a number of receiver ports that are internal to the port ring 250 of the programmable processor 202 or the output processor element 304 (not shown in FIG. 8).

Figure 9A:
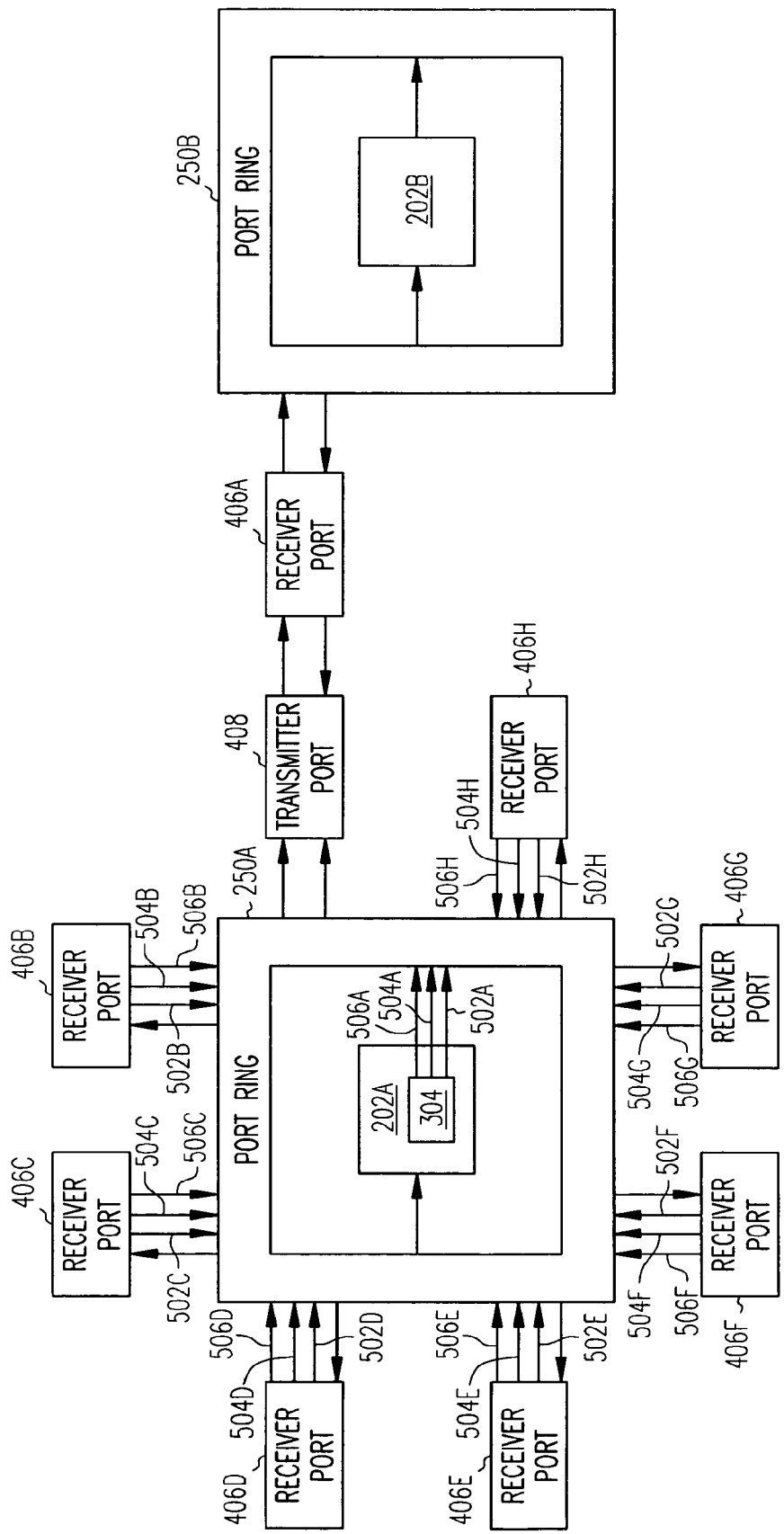
FIGS. 9A-9E illustrate a more detailed block diagram of a transmitter port communicating with different receiver ports that using different interface signals, according to one embodiment of the invention.

To illustrate, FIGS. 9A-9E illustrate a more detailed block diagram of a transmitter port communicating with different receiver ports that using different interface signals, according to one embodiment of the invention. In particular, FIG. 9A illustrates a more detailed block diagram of the transmitter port 408 receiving interface signals from elements that are internal to the port ring 250 of the programmable processor 202 that the transmitter port 408 is associated. FIGS. 9B-9E illustrate a more detailed block diagram of the transmitter port 408 receiving interface signals from a receiver port 406 that is external to the port ring 250 of the programmable processor 202 that the transmitter port 408 is associated.

FIGS. 9A-9E illustrate the programmable processor 202A and the programmable processor 202B. The programmable processor 202A and the programmable processor 202B include the port ring 250A and the port ring 250B, respectively. Additionally, the programmable processors 202A-202B include a number of receiver and transmitter ports. In particular, a given port 404 (shown in FIG. 4) includes a transmitter port and a receiver port. However, for the sake of clarity, FIGS. 9A-9E illustrate either a transmitter port or receiver port for a given port 404. The port ring 250A of the programmable processor 202A includes the receiver ports 406B-406H and the transmitter port 408. The port ring 250B of the programmable processor 202B includes the receiver port 406A.

With regard to FIG. 9A, the output processor element 304 (within the programmable processor 202A) is coupled to transmit the init_in signal 506A, the data_in signal 502A and the request_in signal 504A. The receiver port 406B transmits the init_in signal 506B, the data_in signal 502B and the request_in signal 504B. The receiver port 406C transmits the init_in signal 506C, the data_in signal 502C and the request_in signal 504C. The receiver port 406D transmits the init_in signal 506D, the data_in signal 502D and the request_in signal 504D. The receiver port 406E transmits the init_in signal 506E, the data_in signal 502E and the request_in signal 504E. The receiver port 406F transmits the init_in signal 506F, the data_in signal 502F and the request_in signal 504F. The receiver port 406G transmits the init_in signal 506G, the data_in signal 502G and the request_in signal 504G. The receiver port 406H transmits the init_in signal 506H, the data_in signal 502H and the request_in signal 504H.

With regard to FIG. 8, the transmitter FIFO 806 within the transmitter port 408 uses a select signal 802 to cause the multiplexers 804A-804C to select one of the init_in signals 506, one of the data_in signals 502 and one of the request_in signals 504. As described above, the host processor 108 configures the programmable processing unit 106, wherein output from one processor element in a programmable processor 202 may be input to be processed by a different processor element in a different programmable processor 202 through a logical connection. Accordingly, the host processor 108 causes the transmitter FIFO 806 to assert the select signal 802 to select the init_in signal 506, the data_in signal 502 and the request_in signal 504 from the appropriate source. Returning to FIG. 2 to help illustrate, if a receiver port receives data into the programmable processor 202B and is to output the data through a transmitter port 408 in the programmable processor 202B to a receiver port in the programmable processor 202A, the host processor 108 would configure this transmitter port 408 to select signal 606 from this receiver port.

Accordingly, the selected receiver port 406 (or the selected output processor element 304) uses the init_in signal 506 to initialize the logical connection. In an embodiment, this initialization may include flushing of the receiver and transmitter FIFOs in the ports that are used in the logical connection. Therefore, if any data is within these FIFOs (prior to this initialization), this initialization causes the data to be deleted therefrom. Additionally, the selected receiver port 406 (or the selected output processor element 304) uses the request_in signal 504 to request the input of data into the transmitter FIFO 806 for the transmitter port 408. The selected receiver port 406 (or the selected output processor element 304) uses data_in signal 502 to transmit data into the transmitter FIFO 806.

Additionally as shown in FIG. 8, the transmitter port 408 transmits and receives interface signals from the receiver port 406A of a different programmable processor 202 (the programmable processor 202B). FIGS. 9B-9E illustrate such communications.

Figure 9B:
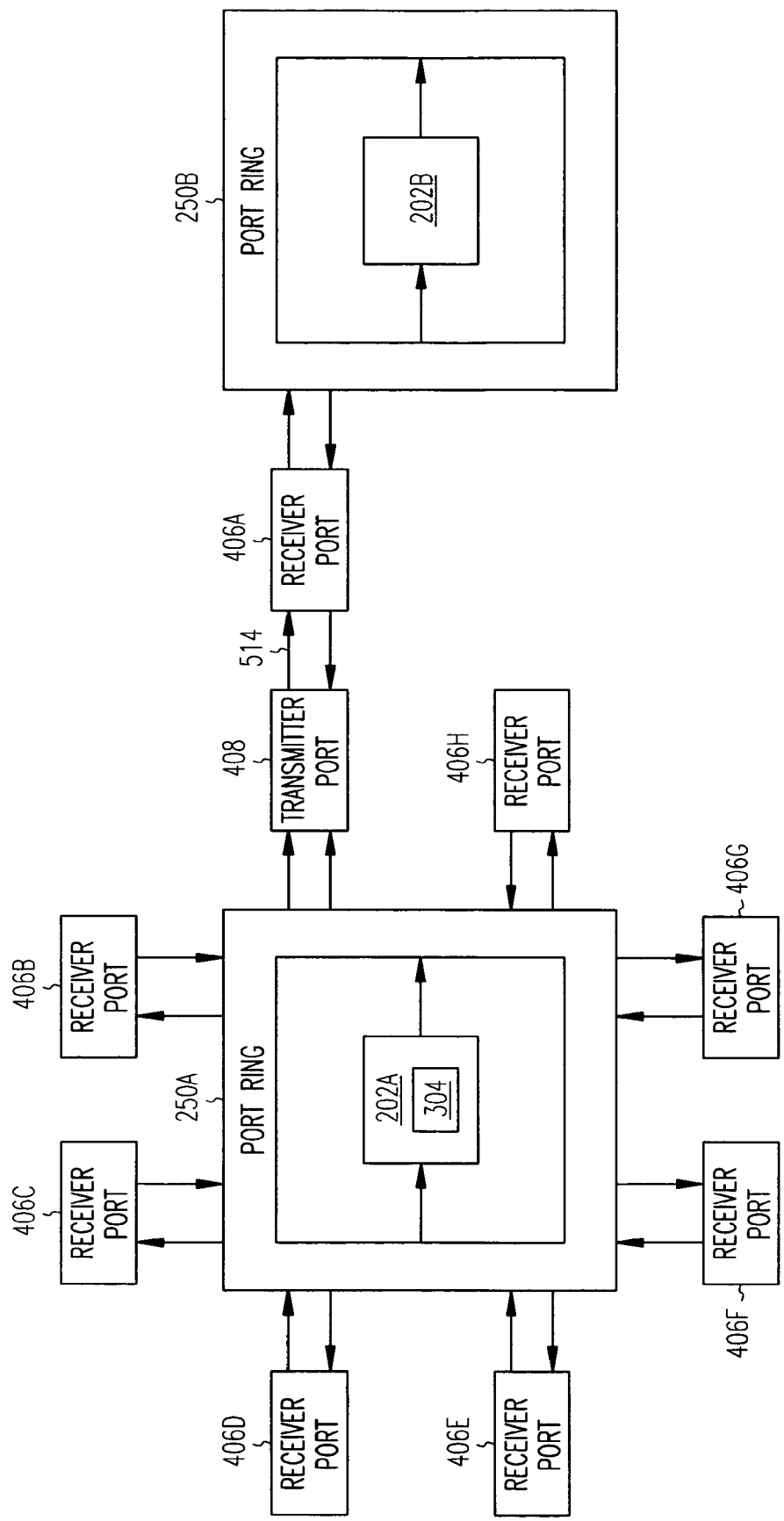
Figure 9C:
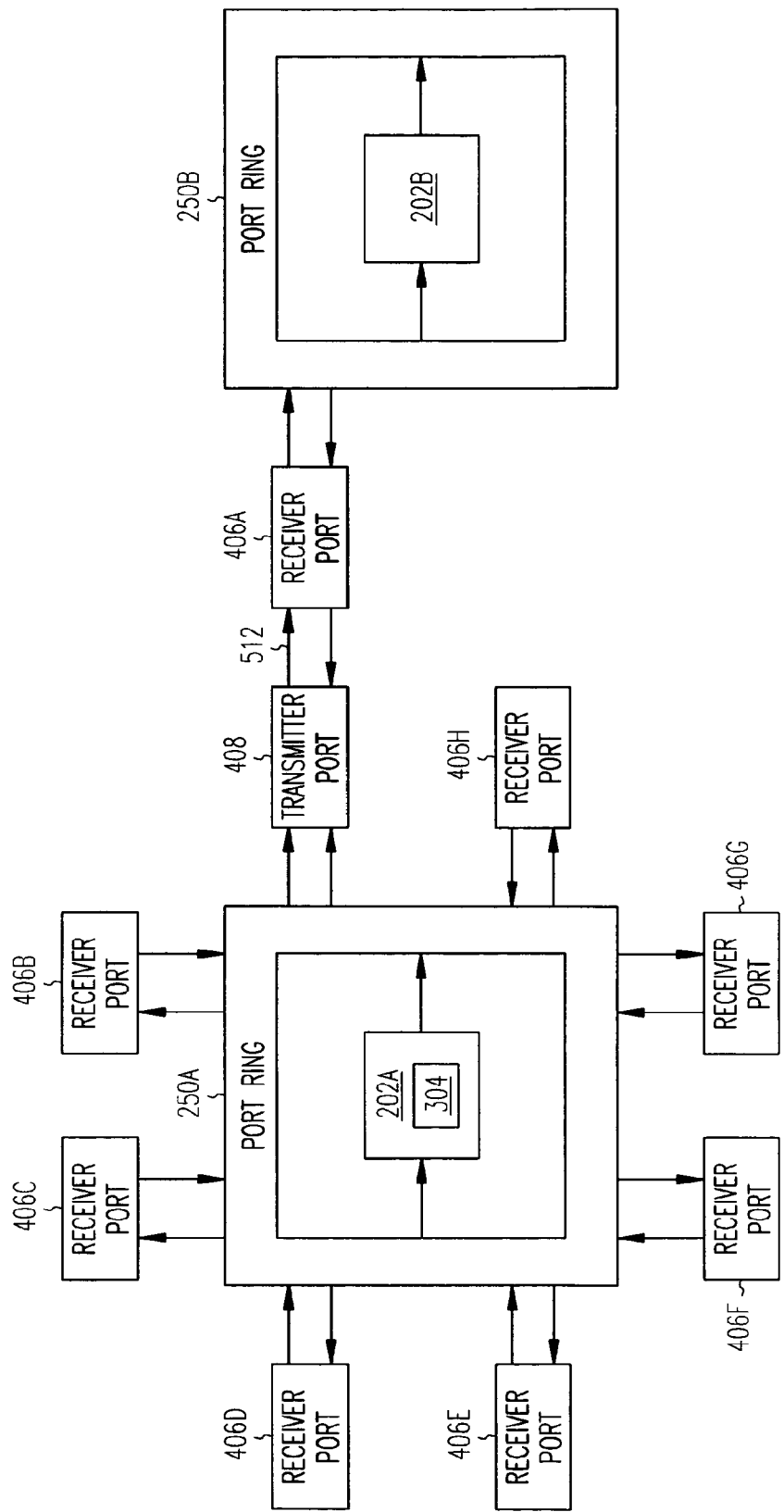
Figure 9D:
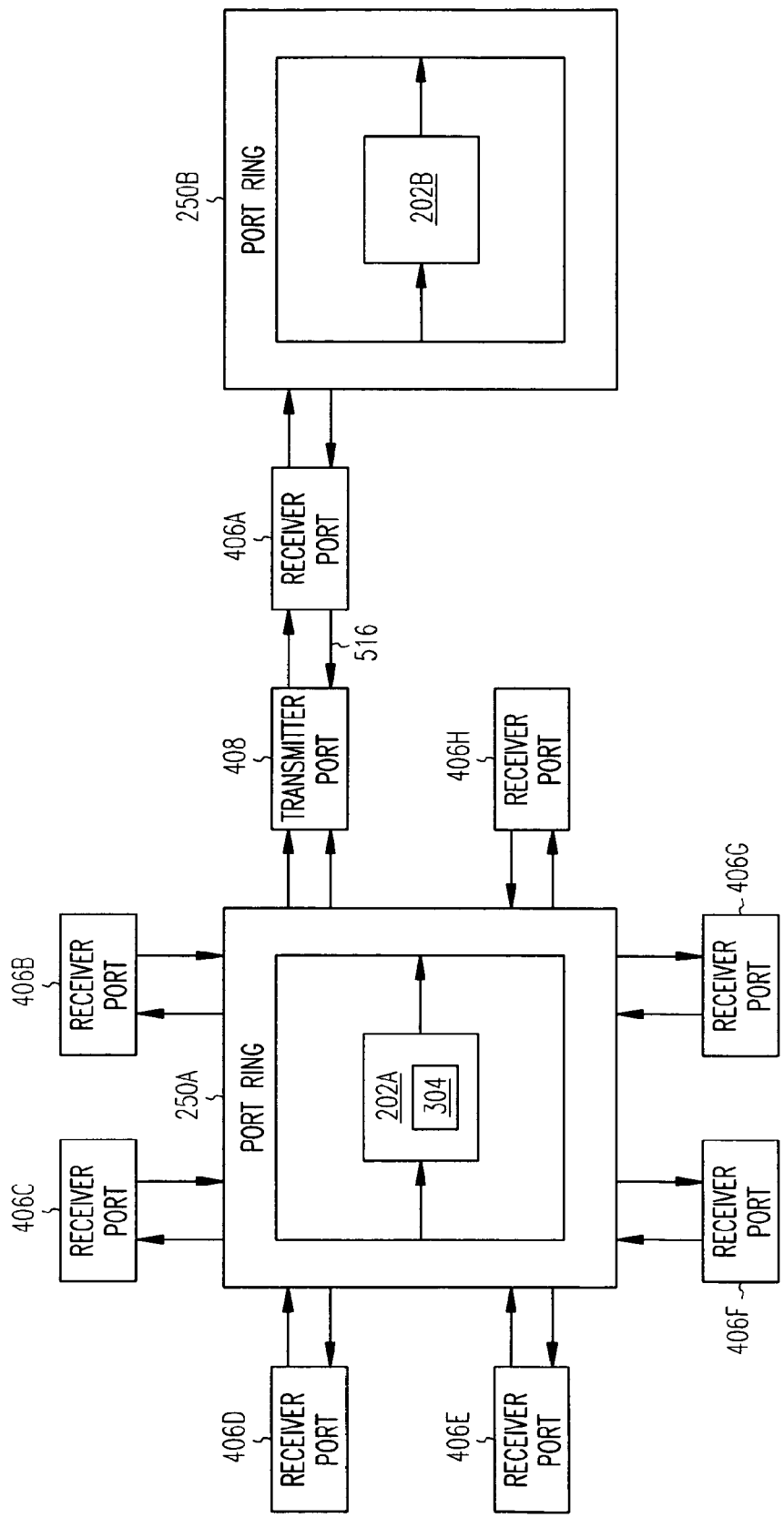
Figure 9E:
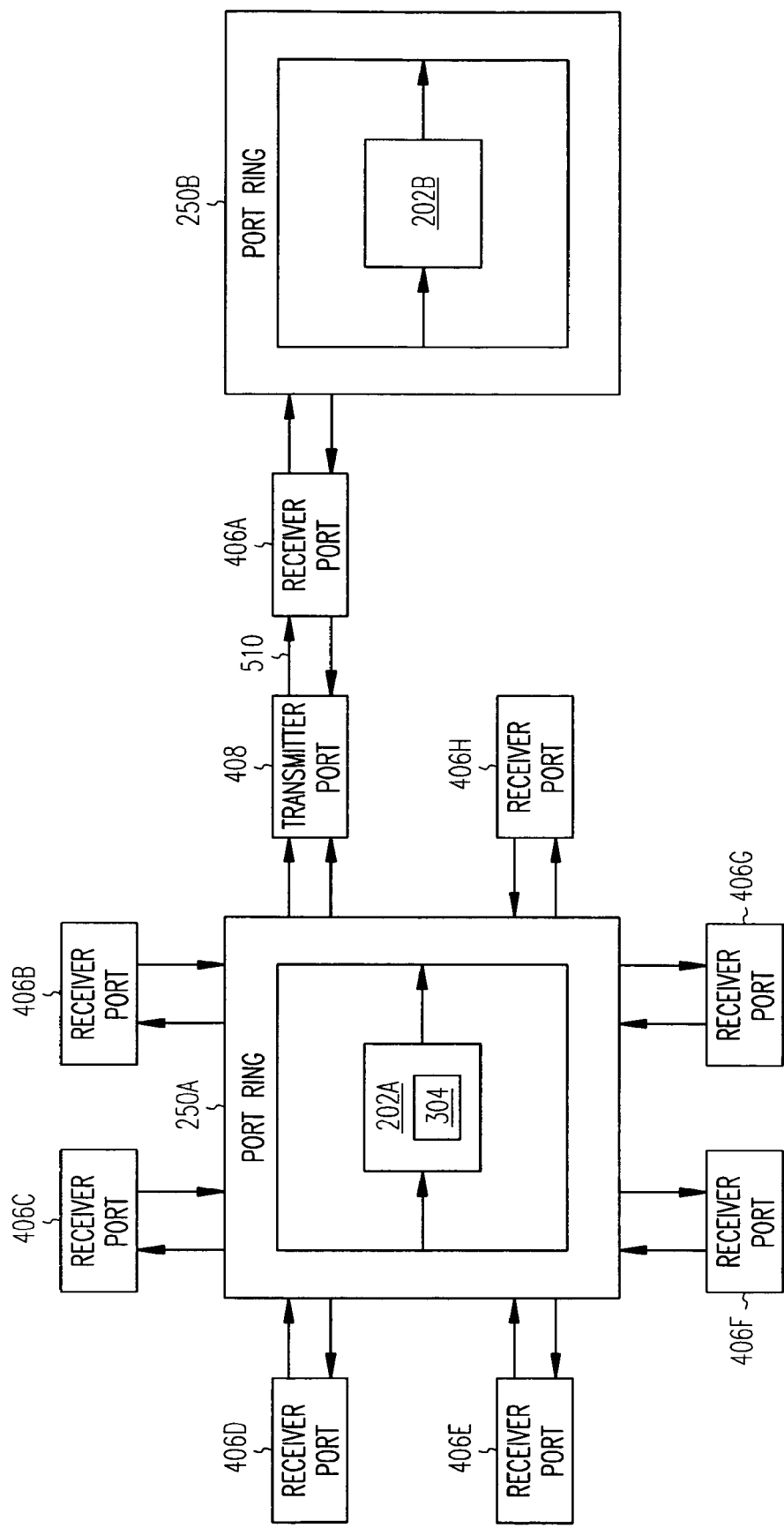

FIG. 9B illustrates that the transmitter port 408 outputs the init_out signal 514 to the receiver port 406A to which it is attached to generate the logical connection prior to the transmission of data (as described above). FIG. 9C illustrates that the transmitter port 408 outputs the request_out signal 512 to request the inputting of data into the receiver FIFO of the receiver port 406A. FIG. 9D illustrates that, in response, after space is available in the receiver FIFO of the receiver port 406A, the receiver port 406A outputs the grant_out signal 516 that is received by the transmitter port 408. FIG. 9E illustrates that, in response, the transmitter port 408 outputs data from the transmitter FIFO 806 to the receiver FIFO of the receiver port 406A using the data_out signal 510.

Logical Connections Among Programmable Processors

Figure 10:
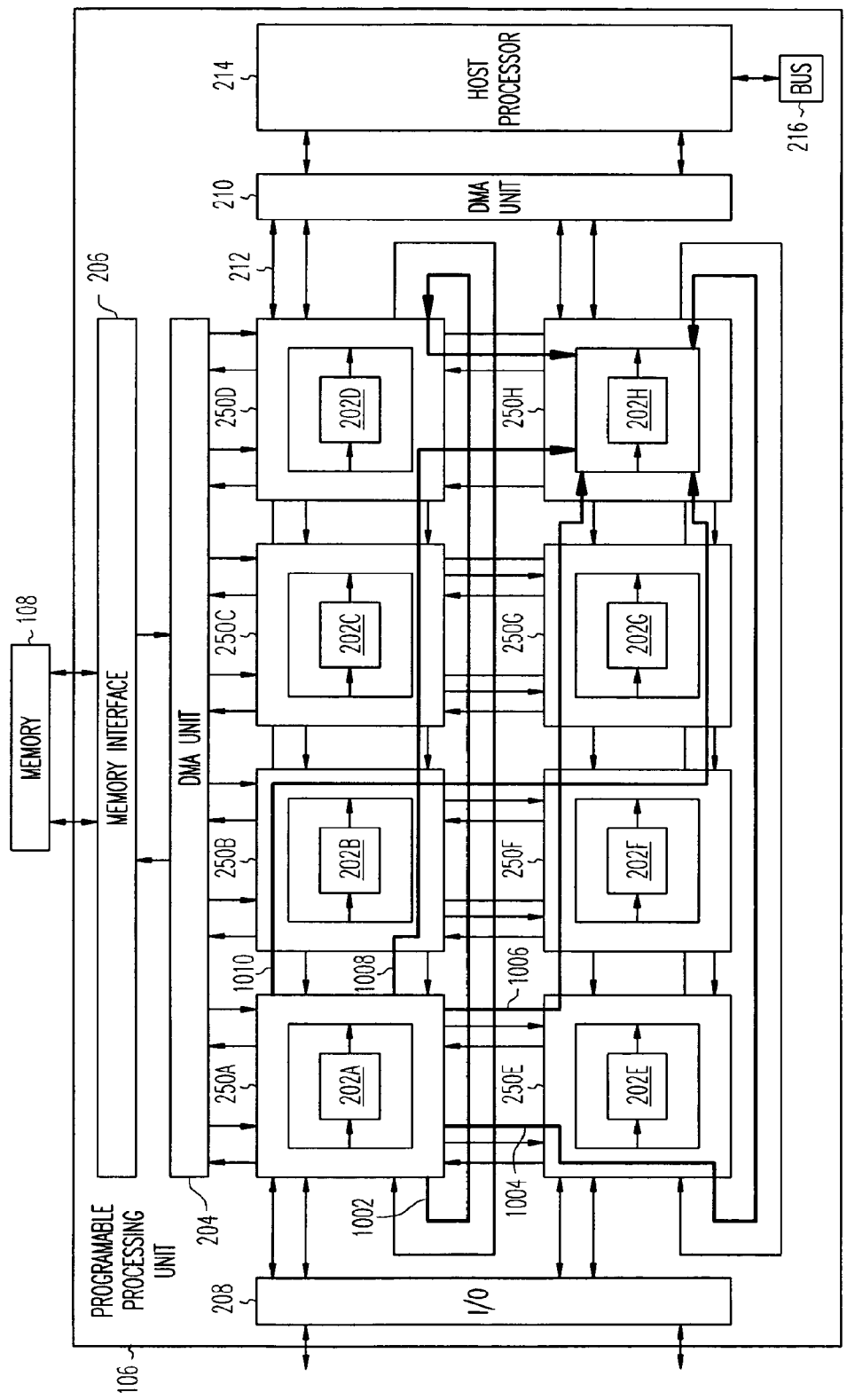
FIG. 10 illustrates a number of different routes for a given logical connection from a source programmable processor to a destination programmable processor, according to one embodiment of the invention.

FIG. 10 illustrates a number of different routes for a given logical connection from a source programmable processor to a destination programmable processor, according to one embodiment of the invention. As described above, the host processor 108 can establish a number of logical connections for the transmission of data from a source programmable processor 202 to a destination programmable processor 202. In particular, the output of one processing operation by an element in a first programmable processor 202 may be used as input for a different processing operation by an element in a second programmable processor 202.

For example, assume that the programmable processing unit 106 is in an image processing mode (which is described in more detail below). The first programmable processor 202 may perform an operation to reduce ghosting in the video, while the second programmable processor 202 receives the output from the first programmable processor 202 and may perform an operation to reduce noise in the video. A third programmable processor 202 may receive the output from the second programmable processor 202 and may perform an operation to reduce the dot-crawl in the video. In an embodiment, different programmable processors 202 perform different data operations because (as described in more detail below) one programmable processor 202 may have dedicated hardware accelerators for performing a given operation.

Moreover, while this example illustrates the output of an operation in one programmable processor 202 being transmitted directly to a different programmable processor 202, embodiments of the invention are not so limited. In an embodiment, one programmable processor 202 may transmit the output of an operation to one of the memories 104. Accordingly, a second programmable processor 202 may retrieve the stored data from the memory 104. Such operations may be used when the second programmable processor 202 may require a certain amount of the output from the first operation prior to its operations. For example, the second programmable processor 202 may perform a temporal noise reduction operation across a number of frames of the video. Accordingly, the output from the first programmable processor 202 is stored in the memory 108 until a predetermined number of frames have been processed. Continuing with this example, the first programmable processor 202 may continue to perform the ghost reduction operation of the incoming video, while, simultaneously, the second programmable processor 202 may perform the temporal noise reduction operation of the outputted video (as described above). Similarly, the programmable processing unit 106 may perform multiple operations across different programmable processors 202 during the storage mode (which is further described below).

Because the architecture of the processors has a point-to-point configuration (as illustrated in FIG. 2), the first programmable processor 202 may not be directly connected to the second programmable processor 202. Therefore, a logical connection from the first programmable processor 202 (the source programmable processor 202) to the second programmable processor 202 (the destination programmable processor 202) through one to a number of intermediate programmable processors 202 is established.

FIG. 10 illustrates the programmable processing unit 106 of FIG. 2, along with five different routes for a given logical connection from the programmable processor 202A to the programmable processor 202H.

A first route 1002 for a logical connection starts at the programmable processor 202A (the source programmable processor) and goes through the port ring 250D of the programmable processor 202D (a first intermediate programmable processor) and completes at the port ring 250H of the programmable processor 202H (the destination programmable processor). In particular, the data is transmitted from a transmitter port of the port ring 250A of the programmable processor 202A to a receiver port of the port ring 250E of the programmable processor 202D. The receiver port of the port ring 250D of the programmable processor 202D transmits the data to a transmitter port of the port ring 250D of the programmable processor 202D (through the port ring 250D of the programmable processor 202D). This transmitter port of the port ring 250D of the programmable processor 202D transmits the data to a receiver port of the port ring 250H of the programmable processor 202H.

A second route 1004 for a logical connection starts at the programmable processor 202A (the source programmable processor) and goes through the programmable processor 202E (a first intermediate programmable processor) and completes at the programmable processor 202H (the destination programmable processor). In particular, the data is transmitted from a transmitter port of the port ring 250A of the programmable processor 202A to a receiver port of the port ring 250E of the programmable processor 202E. The receiver port of the port ring 250E of the programmable processor 202E transmits the data to a transmitter port of the port ring 250E of the programmable processor 202E (through the port ring 250E of the programmable processor 202E). This transmitter port of the port ring 250E of the programmable processor 202E transmits the data to a receiver port of the port ring 250H of the programmable processor 202H.

A third route 1006 for the logical connection starts at the programmable processor 202A (the source programmable processor) and goes through the programmable processor 202E (a first intermediate programmable processor) through the programmable processor 202F (a second intermediate programmable processor) through the programmable processor 202G (a third intermediate programmable processor) and completes at the programmable processor 202H (the destination programmable processor). In particular, the data is transmitted from a transmitter port of the port ring 250A of the programmable processor 202A to a receiver port of the port ring 250E of the programmable processor 202E. The receiver port of the port ring 250E of the programmable processor 202E transmits the data to a transmitter port of the port ring 250E of the programmable processor 202E (through the port ring 250E of the programmable processor 202E). This transmitter port of the port ring 250E of the programmable processor 202E transmits the data to a receiver port of the port ring 250F of the programmable processor 202F. The receiver port of the port ring 250F of the programmable processor 202F transmits the data to a transmitter port of the port ring 250F of the programmable processor 202F (through the port ring 250F of the programmable processor 202F). This transmitter port of the port ring 250F of the programmable processor 202F transmits the data to a receiver port of the port ring 250G of the programmable processor 202G. The receiver port of the port ring 250G of the programmable processor 202G transmits the data to a transmitter port of the port ring 250G of the programmable processor 202G (through the port ring 250G of the programmable processor 202G). This transmitter port of the port ring 250G of the programmable processor 202G transmits the data to a receiver port of the port ring 250H of the programmable processor 202H.

A fourth route 1008 for the logical connection starts at the programmable processor 202A (the source programmable processor) and goes through the programmable processor 202B (a first intermediate programmable processor) through the programmable processor 202C (a second intermediate programmable processor) through the programmable processor 202D (a third intermediate programmable processor) and completes at the programmable processor 202H (the destination programmable processor). In particular, the data is transmitted from a transmitter port of the port ring 250A of the programmable processor 202A to a receiver port of the port ring 250B of the programmable processor 202B. The receiver port of the port ring 250B of the programmable processor 202B transmits the data to a transmitter port of the port ring 250B of the programmable processor 202B (through the port ring 250B of the programmable processor 202B). This transmitter port of the port ring 250B of the programmable processor 202B transmits the data to a receiver port of the port ring 250C of the programmable processor 202C. The receiver port of the port ring 250C of the programmable processor 202C transmits the data to a transmitter port of the port ring 250C of the programmable processor 202C (through the port ring 250C of the programmable processor 202C). This transmitter port of the port ring 250C of the programmable processor 202C transmits the data to a receiver port of the port ring 250D of the programmable processor 202D. The receiver port of the port ring 250D of the programmable processor 202D transmits the data to a transmitter port of the port ring 250D of the programmable processor 202D (through the port ring 250D of the programmable processor 202D). This transmitter port of the port ring 250D of the programmable processor 202D transmits the data to a receiver port of the port ring 250H of the programmable processor 202H.

A fifth route 1010 for the logical connection starts at the programmable processor 202A (the source programmable processor) and goes through the programmable processor 202B (a first intermediate programmable processor) through the programmable processor 202F (a second intermediate programmable processor) through the programmable processor 202G (a third intermediate programmable processor) and completes at the programmable processor 202H (the destination programmable processor). Accordingly, as shown, one to a number of different routes can be used to establish a logical connection between two different programmable processors 202. In particular, the data is transmitted from a transmitter port of the port ring 250A of the programmable processor 202A to a receiver port of the port ring 250B of the programmable processor 202B. The receiver port of the port ring 250B of the programmable processor 202B transmits the data to a transmitter port of the port ring 250B of the programmable processor 202B (through the port ring 250B of the programmable processor 202B). This transmitter port of the port ring 250B of the programmable processor 202B transmits the data to a receiver port of the port ring 250F of the programmable processor 202F. The receiver port of the port ring 250F of the programmable processor 202F transmits the data to a transmitter port of the port ring 250F of the programmable processor 202F (through the port ring 250F of the programmable processor 202F). This transmitter port of the port ring 250F of the programmable processor 202F transmits the data to a receiver port of the port ring 250G of the programmable processor 202G. The receiver port of the port ring 250G of the programmable processor 202G transmits the data to a transmitter port of the port ring 250G of the programmable processor 202G (through the port ring 250G of the programmable processor 202G). This transmitter port of the port ring 250G of the programmable processor 202G transmits the data to a receiver port of the port ring 250H of the programmable processor 202H.

As described, the traversal through an intermediate programmable processor 202 is through the ports 404 of the port ring 250 and not through processor elements or other components internal to the programmable processor 202. Therefore, the processor elements within an intermediate programmable processor 202 do not perform any type of operation on data that is transmitted from the source programmable processor 202 and the destination programmable processor 202.

Therefore, this architecture uses a combination of hardwired point-to-point connections which are configurable. A transmitter port is connected to a predefined destination, which allows for direct wiring of the die of the programmable processing unit 106. However, a given transmitter port can select one of several sources for the transmitted data. In turn, a receiver port makes its data available to a number of transmitter ports. This architecture allows for efficient routing of data and control within the port ring 250 for a programmable processor 202. Moreover, passing the initialize signal through a logical connection allows for single-point clearing of the logical path that the data is to traverse at the source of the data and ensure that the intermediate connections do not need to be cleaned up or emptied before or after data transfers. Moreover, logical connections that transfer an indeterminate amount of data and get backed up or stalled can be cleared out with a single command beginning at the source and traversing the logical connection.

Operations of the Programmable Processing Unit

Figure 11:
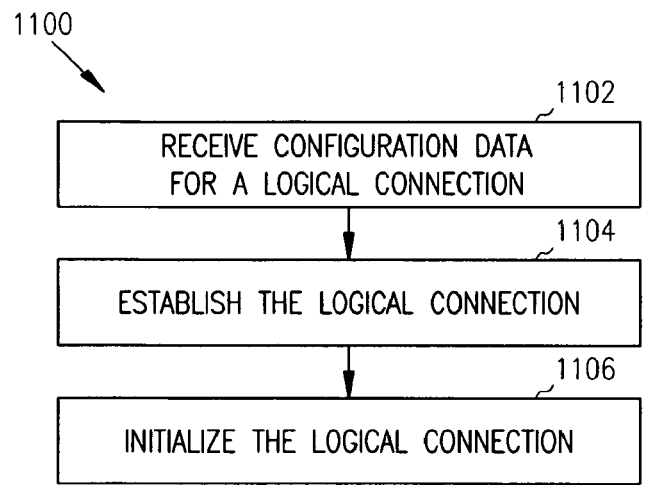
FIG. 11 illustrates a flow diagram for establishing and initializing of a logical connection within a programmable processing unit, according to one embodiment of the invention.

The operations of the programmable processing unit 106, according to one embodiment, are now described.
Data Transmission Operations Among Programmable Processors FIG. 11 illustrates a flow diagram for establishing and initializing of a logical connection within a programmable processing unit, according to one embodiment of the invention.

In block 1102, configuration data for a logical connection to be established for transmission of data is received. With reference to FIG. 2, the different programmable processors 202 (the source programmable processor, the intermediate programmable processor(s) and the destination programmable processor) receive the configuration data for a logical connection to be established for transmission of data. In an embodiment, the host processor 108 transmits this configuration data to these programmable processors 202 through the internal global bus 212. In an embodiment, the host processor 108 may also download microcode into the programmable processors 202 that are part of the logical connection. For example, the host processor 108 may download a specific application into the source and/or destination programmable processor 202. Control continues at block 1104.

In block 1104, the logical connection is established. With reference to FIGS. 6 and 8, the receiver ports 406 and the transmitter ports 408 (through which data is transmitted as part of the logical connection) establish the logical connection based on the configuration data received. As described above, the receiver ports 406 use the select signals 606 to determine which grant_out signal 516 will be selected by multiplexer 602. For example, if the data received into the receiver port 406A is to be outputted to the transmitter port 408D, then the configuration data causes the receiver port 406A is use the select signal 606 to select the grant_out signal 516 associated with the transmitter port 408D. Similarly, the transmitter ports 408 uses the select signals 802 to determine which of the request_in signal 504, the data_in signal 502 and the init_in signal 506 will be selected by the multiplexer 804C, the multiplexer 804B and the multiplexer 804A, respectively. Control continues at block 1106.

In block 1106, the logical connection is initialized. With reference to FIGS. 2, 6 and 8, the transmitter port 408 for the source programmable processor 202 that is to originate this logical connection transmits the init_out signal 514 to the receiver port 406 of the next source programmable processor 202 involved with this logical connection. This receiver port 406 receives this signal as init_in signal 506 and outputs the init_out signal 514 to the transmitter port within this source programmable processor 202. This transmission of init_out signals 514 and receipt of init_in signals 506 continues along the logical connection until the transmitter port 408 of the destination programmable processor 202 is reached. Accordingly, this initialize signal initializes the different ports involved in the logical connection. In an embodiment, this initialization may include flushing of the receiver and transmitter FIFOs that are used in the logical connection. Therefore, if any data is within these FIFOs from a previous logical connection, this initialization causes the data to be deleted therefrom.

Figure 12:
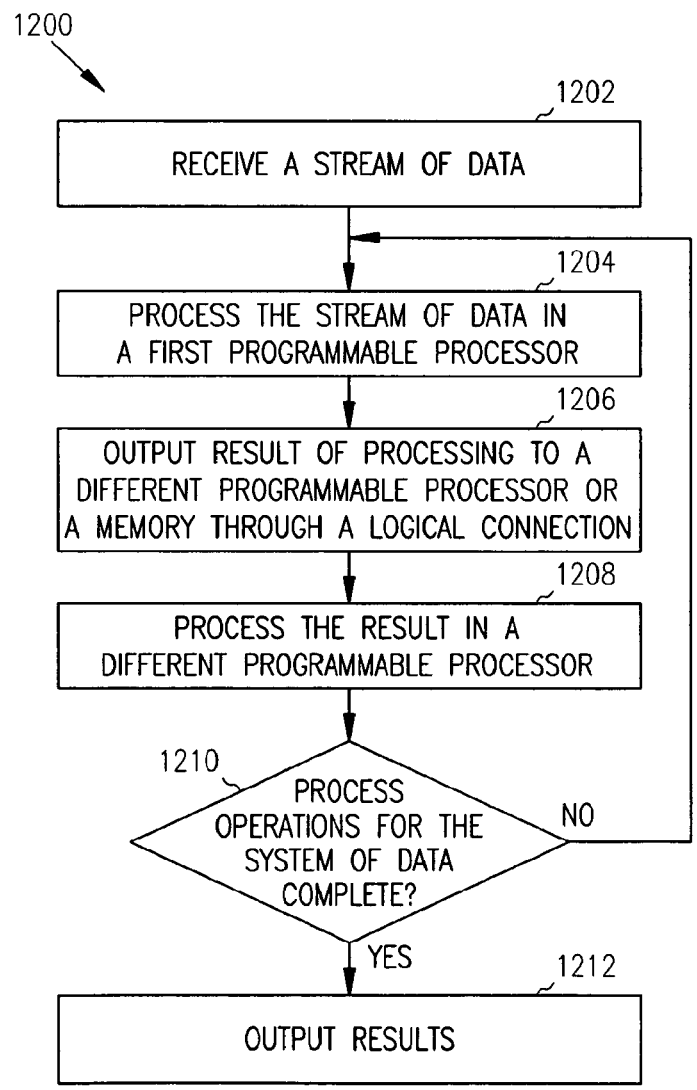
FIG. 12 illustrates a flow diagram for processing of data by a programmable processing unit, according to one embodiment of the invention.

In an embodiment, a series of process operations are performed/executed by different components in different programmable processors 202 within the programmable processing unit 106. The output of a first process operation is used as input to a second process operation, etc. As described above, logical connections are established for the transmission of the data to the different programmable processors 202. Therefore, a logical connection is established for each transmission from one element in the programmable processing unit 106 to a different element in the programmable processing unit 106. One embodiment for the processing of data in the programmable processing unit 106 will now be described. FIG. 12 illustrates a flow diagram for processing of data by a programmable processing unit, according to one embodiment of the invention. In particular, the flow diagram 1200 describes the processing of data by one of the programmable processors 202 within the programmable processing unit 106, according to one embodiment of the invention.

In block 1202, a stream of data is received. With reference to FIG. 2, a first of the programmable processors 202 receives the stream of data from one of a number of sources. For example, the programmable processor 202A may receive the stream of data from an external source (such as the video signal processor 104). The programmable processor 202A may also receive the stream of data from the memory 108 through the memory interface 206 and the DMA unit 204. Control continues at block 1204.

In block 1204, the stream of data is processed in a first programmable processor. With reference to FIG. 2, a component (e.g., one of the processor elements 302, 304, 306A-306C or one of the accelerator units 310A-310B) within the first programmable processor 202 performs a first process operation. The input processor element 302 receives the data through the receiver port 406. In an embodiment, any of the processor elements 302, 304, 306A-306C performs/executes the process operation on the received data. In one embodiment, as part of the configuration of the logical connection of which the process operation is associated, the host processor 214 may indicate which of the components in the first programmable processor 202 is to perform/execute the process operation. Accordingly, the input processor element 302 may store the data into the memory 314 wherein the designated components retrieves the data and performs/executes the first process operation on such data. The first programmable processor 202 may output a result for processing a part of the stream of data, while continuing to process a different part of the stream of data. For example, the first programmable processor 202 may output a result for processing the first frame of video, while continuing to process subsequent frames of the video. Control continues at block 1206.

In block 1206, the output of the process operation is transmitted/forwarded to a different programmable processor or a memory through a logical connection. With reference to FIGS. 2 and 3, the output processor element 304 (in the programmable processor 202 in which the first process operation is performed/executed) transmits/forwards the output of the process operation through a transmitter port 408 that is part of the configured logical connection to a different programmable processor 202 or to the memory 108 through the configured logical connection. Control continues at block 1208.

In block 1208, the result is processed in the different programmable processor. Similar to the processing in the first programmable processor (described in block 1204), a component (e.g., one of the processor elements 302, 304, 306A-306C or one of the accelerator units 310A-310B) within the different programmable processor 202 performs a different image process operation. Control continues at block 1210.

In block 1210, a determination is made of whether the process operations for the stream of data are completed. In particular, the current programmable processor 202 that is processing a part of the stream of data determines whether the output of its operations is to be transmitted to a different programmable processor 202 or to the memory 108 through a logical connection based on configuration data received from the host processor 214. In particular, the host processor 214 may configure the programmable processing unit 106 to receive a stream of data and to perform five different compression/storage process operations in five different programmable processors 202. Accordingly, the host processor 214 configures the different logical connections to transmit the data to the five different programmable processors 202 in a given order. Upon determining that the process operations are not complete for the stream of data, control continues at block 1006 wherein the result of the processing is outputted to a different programmable processor 202 or the memory 108. The operations of block 1206 and 1206 continue until the process operations are complete for the stream of data.

In block 1212, upon determining that the process operations are complete for the stream of data, the results are outputted. With reference to FIG. 2, in one embodiment, if the current mode is the storage mode, the final programmable processor 202 in the chain of programmable processors to process the stream of data outputs the result to the memory 108. With reference to FIG. 1, in an embodiment, if the current mode is the image processing mode, the final programmable processor 202 outputs the result to the video display processor 110 through the I/O interface 208.

Figure 13A:
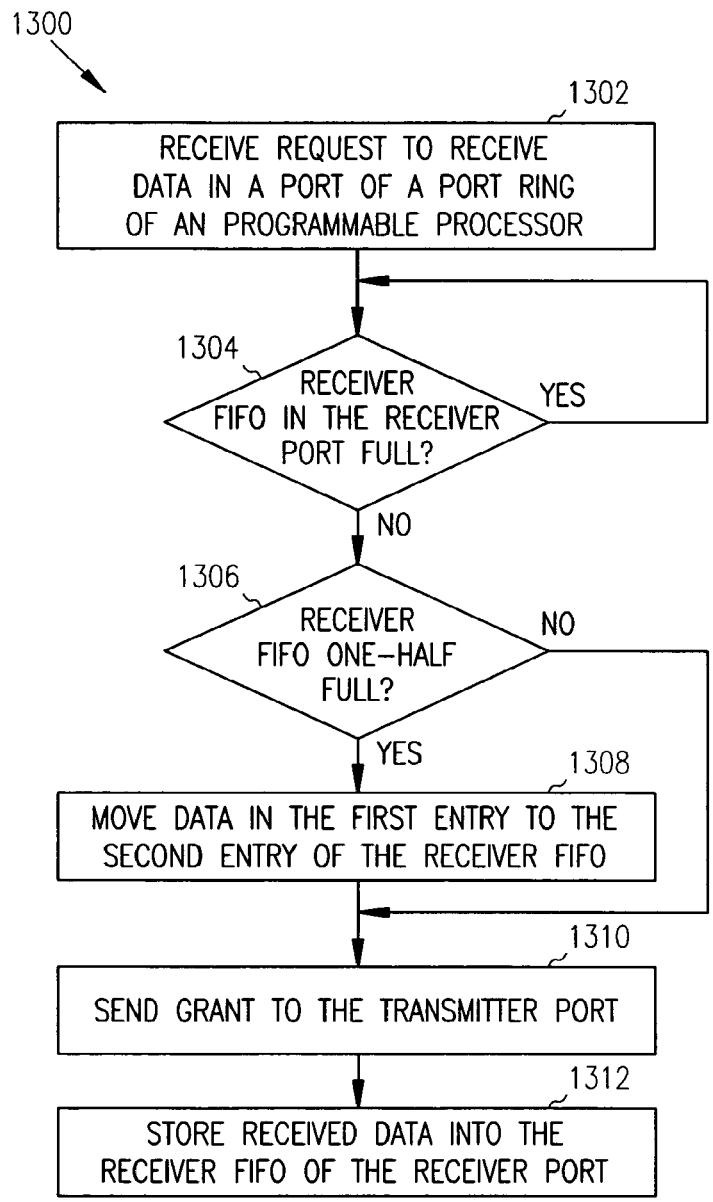
FIGS. 13A-13B illustrate flow diagrams for communications among memories of different ports in a programmable processor, according to embodiments of the invention.
Figure 13B:
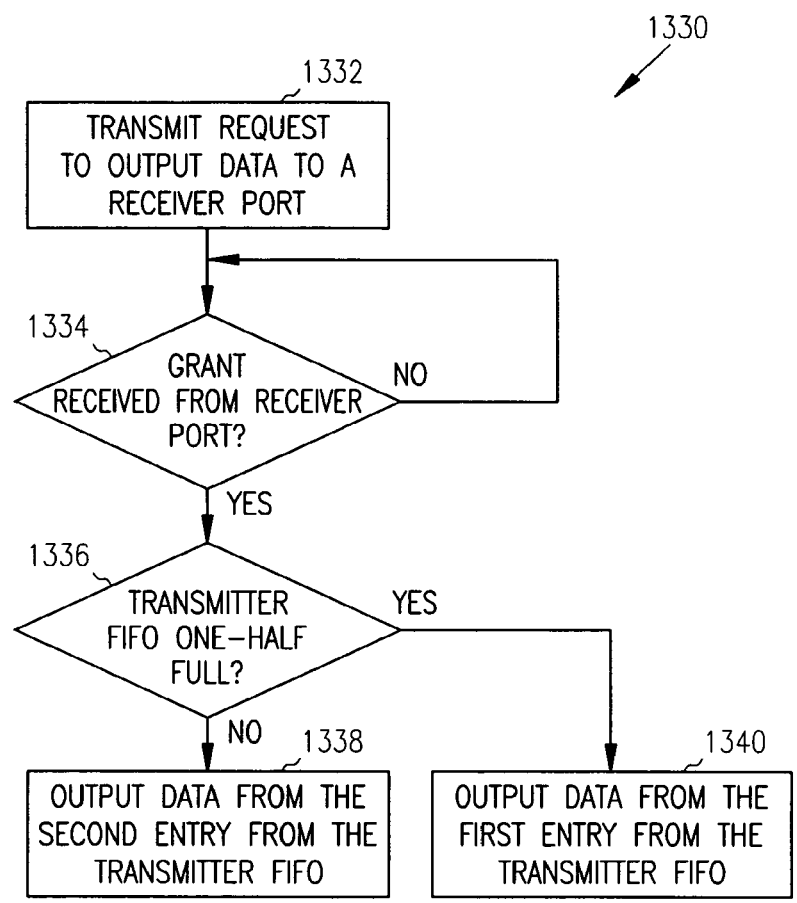

One embodiment of the operations for the transmission of data between different ports of the programmable processors 202 based on a handshake protocol will now be described. In particular, FIGS. 13A-13B illustrate flow diagrams for communications among memories of different ports in a programmable processor, according to embodiments of the invention. By way of example and not by way of limitation, the operations of the flow diagram 1300 and 1330 are described such that the FIFO memories within these different ports have a depth of two (i.e., a two-entry FIFO). FIG. 13A illustrates a flow diagram for receiving data into a memory of a port, while FIG. 13B illustrates a flow diagram for transmitting data out of a memory of a port.

In block 1302, a request to receive data is received into a receiver port of a port ring of a programmable processor. With reference to FIG. 6, the receiver port 406 receives a request to receive data through the request_in signal 504. As described above, a transmitter port 408 that is coupled to the receiver port 406 transmits this request. Control continues at block 1304.

In block 1304, a determination is made of whether the receiver FIFO of the receiver port is full. With reference to FIG. 6, the receiver port 406 determines whether the receiver FIFO 406 is full. Upon determining that the receiver FIFO 604 of the receiver port 406 is full, control continues at block 1304 where this determination is again made. In an embodiment, this request may time out after a predetermined period, wherein an alarm is issued to the host processor 108 and the operation of the flow diagram 1300 are aborted.

In block 1306, upon determining that the receiver FIFO 604 of the receiver port 406 is not full, a determination is made of whether the receiver FIFO is one-half full. As described above, the receiver FIFO 604 is described as having a depth of two. With reference to FIG. 6, the receiver port 406 determines whether the receiver FIFO 604 is one-half full. In other words, the receiver port 406 determines whether the receiver FIFO 604 is empty or has data in one entry. Upon determining that the receiver FIFO is not one-half full (i.e., the receiver FIFO is empty), control continues at block 1310, which is described in more detail below.

In block 1308, upon determining that the receiver FIFO is one-half full, data stored in the first entry in the receiver FIFO is moved to the second entry in the receiver FIFO. With reference to FIG. 6, the receiver port 406 moves the data stored in the first entry to the second entry in the receiver FIFO 604. Control continues at block 1310.

In block 1310, a grant is sent to the requesting transmitter port (the transmitter port requesting to send data to the receiver port). With reference to FIG. 6, the receiver port 406 transmits a grant through the grant_in signal 508 to the transmitter port 408, thereby indicating that the transmitter port 408 may transmit data into the receiver FIFO 604. Control continues at block 1312.

In block 1312, received data is stored into the receiver FIFO of the receiver port. With reference to FIG. 6, the receiver port 406 stores the received data into the first entry of the receiver FIFO 604, which is received from the transmitter port 408 through the data_in signal 502.

An embodiment of transmitting data out of a memory of a port is now described in conjunction with the flow diagram 1330 of FIG. 13B. In block 1332, a request to output data to a receiver port is transmitted. With reference to FIG. 8, the transmitter port 408 transmits the request to output data to the receiver port 406 (to which the transmitter port 408 is coupled) through the request_out signal 512. Control continues at block 1334.

In block 1334, a determination is made of whether a grant has been received from the receiver port. With reference to FIG. 8, the transmitter port 408 determines whether a grant has been received from the receiver port 406 based on the value of the grant_out signal 516. Upon determining that the grant has not been received from the receiver port 406, control continues at block 1334, wherein the transmitter port 408 again makes this determination. In an embodiment, this checking of a grant may time out after a predetermined period, wherein an alarm is issued to the host processor 108 and the operation of the flow diagram 1300 are aborted.

In block 1336, upon determining that the grant has been received from the receiver port, a determination is made of whether the transmitter FIFO is one-half full. With reference to FIG. 8, the transmitter port 408 determines whether the transmitter FIFO 706 is one-half full. Because the operations of the flow diagram 1330 have been initiated, the assumption is that the transmitter FIFO 706 is not empty.

In block 1338, upon determining that the transmitter FIFO is not one-half full (the transmitter FIFO is full), data from the second entry of the transmitter FIFO is outputted to the receiver FIFO. With reference to FIG. 8, the transmitter port 408 outputs the data from the second entry of the transmitter FIFO 706 through the data_out signal 510 to the receiver FIFO, thereby completing the operations of the flow diagram 1330.

In block 1340, upon determining that the transmitter FIFO is one-half full, data from the first entry of the transmitter FIFO is outputted to the receiver FIFO. With reference to FIG. 8, the transmitter port 408 outputs the data from the first entry of the transmitter FIFO 706 through the data_out signal 510 to the receiver FIFO, thereby completing the operations of the flow diagram 1330.

While the flow diagrams 1300 and 1330 describe the communications between receiver and transmitter ports that are part of different port rings, the handshake protocol operations described are also applicable to communications between receiver and transmitter ports that are part of the same port ring. Moreover, such handshake protocol operations are applicable for the inputting and outputting of data into the input processor element 302 and the output processor element 304, respectively.

Accordingly, as described in FIG. 13A-13B, in an embodiment, the data driven architecture for image process operations is based on this handshake protocol for transmitting data through the different port for logical connections. A bubble is a clock period where no data transaction occurred (i.e., data was not moved in the given clock period). For example, data was not ready to be transmitted at the beginning and/or data was not retrieved at the end of the logical connection. Therefore, there may be an empty place in the logical connection because data was not put into the logical connection.

Moreover, as described, if a bubble forms in the logical connection because of a data stall condition at the source programmable processor or the destination programmable processor, then data is paused for a single clock period. In other words, the FIFO memories within the receiver and transmitter ports allow for bubbles in the logical connection that do not grow from stopping and restarting of the data flow within the logical connection. Embodiments of the invention are such that a bubble does not force a delay at either end of the logical connection beyond the bubble. The bubble does not require the programmable processing unit 106 to resync (which may require more clock periods to recover than the number of clocks periods associated with the bubble itself).

Multiple Mode Operations of the Programmable Processing Unit

Figure 14:
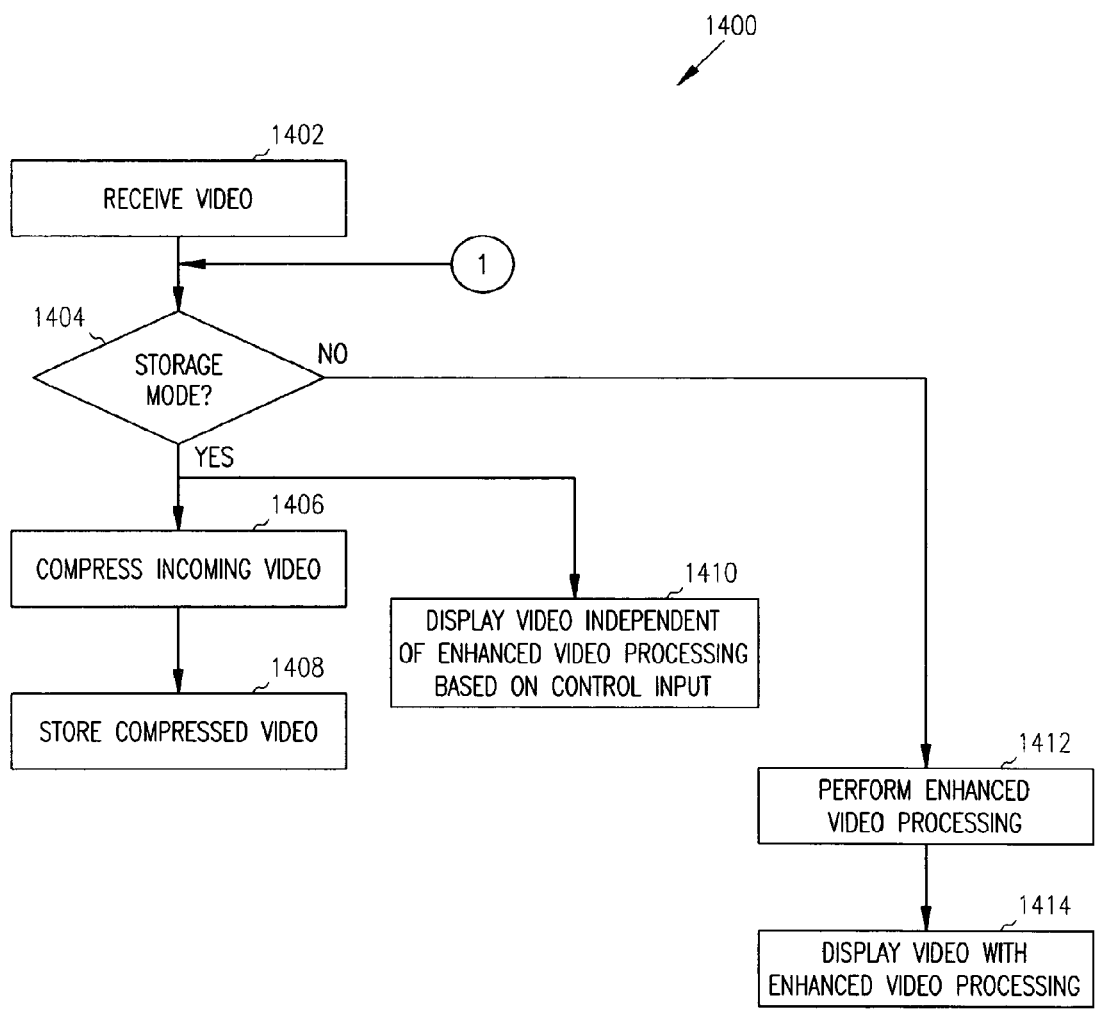
FIG. 14 illustrates a flow diagram for multiple mode operations of a programmable processing unit, according to one embodiment of the invention.

The multiple mode operations of the programmable processing unit 106 are now described. FIG. 14 illustrates a flow diagram for multiple mode operations of a programmable processing unit, according to one embodiment of the invention.

In block 1402 of the flow diagram 1400, video is received. With reference to the embodiment of FIG. 1, the programmable processing unit 106 receives video from the video signal processor 104 through the I/O interface 208. In an embodiment, the received video is a stream of digital data.

In block 1404, a determination is made of whether the system is in a storage mode. With reference to the embodiment of FIG. 2, the host processor 214 makes this determination. In an embodiment, the system 100 is in one of two modes: 1) a storage mode or 2) an image processing mode. The host processor 214 may make this determination based on input from a user of the system 100. In an embodiment, the system 100 is within a television (or part of a set-top box or media center coupled thereto) wherein a user selects the current mode using a remote control. For example, the user may cause the system 100 to be in the storage mode when pausing the display of the video to the video display 112. The user may also cause the system 100 to be in the storage mode when rewinding the video being displayed on the video display 112. Accordingly, the host processor 214 receives this input from the user. In one embodiment, I/O logic (not shown) within the system 100 may receive and process input for the system 100. Such I/O logic can forward this input to the host processor 214.

In an embodiment, the current mode of the system 100 remains in the storage mode until the memory 108 does not have stored video therein. For example, if the user discontinues a pause operation the display on the video display 112 (thereby resuming display), the system 100 continues in the storage mode until the memory 108 does not include stored video. Therefore, if the memory 108 includes stored video, the system 100 may remain in the storage mode until the user performs a fast-forward operation (for example to skip a commercial). Such an operation causes the rate of output of the video from the memory 108 to exceed the rate of input of the incoming video therein.

Upon determining that the current mode of the system 100 is not the storage mode (but rather in the image processing mode), control continues at block 1412, which is described in more detail below. Upon determining that the current mode of the system 100 is in the storage mode, control continues at blocks 1406 and 1410, which are now described.

In block 1406, the video is compressed. With reference to the embodiment of FIGS. 2 and 3, one or more processor elements in one or more programmable processors 202 compress the video. In one embodiment, as part of the compression of the video, a number of different noise reduction operations may be performed. In an embodiment, the compression of the video may include image scaling, frame rate reduction, etc. Returning to FIG. 2 to help illustrate, a processor element in the programmable processor 202A may perform a noise reduction operation. The programmable processor 202E can receive the output from this noise reduction operation. A processor element in the programmable processor 202E can reduce the image in the video through an image scale operation. The programmable processor 202H may receive the output from this image scale operation. A processor element in the programmable processor 202H may further compress the video through a frame rate reduction operation.

Accordingly, as described in this example, in an embodiment, the host processor 214 downloads the appropriate microcode into the appropriate programmable processors 202. In particular, the host processor 214 may download microcode into the programmable processors 202 when the current mode of the system 100 changes. For example, assume that the processor elements in the programmable processor 202 have been configured to perform an enhanced video processing operation (as further described below) as part of the image processing mode. Therefore, after the current mode of the system 100 is changed to the storage mode, the host processor 214 may download microcode into the programmable processor 202H for the frame rate reduction operation.

Additionally, the host processor 214 may configure the logical connections among the programmable processors 202 for processing (as described above in conjunction with the description of FIG. 10). In an embodiment, at least one of the programmable processors 202 may be configured to store its result into the memory 108, which is subsequently retrieved by a different programmable processor 202. For example, if one of the compression operations is performed across a number of frames of the video, a given number of frames of video may be stored in the memory 108 prior to processing by the different programmable processor 202.

Returning to the example above regarding the different processor elements in the different programmable processors performing the different compression operations, the host processor 214 establishes a logical connection from the I/O interface 208 to the programmable processor 202A. The host processor 214 also establishes a logical connection from the programmable processor 202A to the programmable processor 202E. The host processor 214 also establishes a logical connection from the programmable processor 202E to the programmable processor 202H. Control continues at block 1408.

In block 1408, the compressed video is stored. With reference to the embodiment of FIG. 2, one of the programmable processors 202 stores the compressed video. As described above, in an embodiment, a number of compression operations are performed on the video by at least one of the programmable processors 202. The programmable processor 202 that completes the compression operations may store the compressed video into the memory 108. Returning to the example described above in relation to the block 1406, after completion of the frame rate reduction operation, the programmable processor 202 stores this result into the memory 108 through a logical connection (between the given programmable processor 202 and the memory 108 as described above).

In block 1410, the video is displayed (independent of enhanced video processing) based on control input. As described above, in an embodiment, the system 100 is part of a television or other viewing device. A user of such device controls the displaying of the video on the video display 112. For example, the user may pause, replay, fast forward or play the video on the video display 112 using a remote control. Accordingly, the control input is received from the user and transmitted to the host processor 214. If the control input is to play the video, the host processor 214 establishes a number of logical connections to uncompress the video that is stored in the memory 108 and to output such video to the video display processor 110 for display on the video display 112.

To illustrate, assume that an image scaling operation and a frame rate reduction operation are performed to compress the video stored in the memory 108. Therefore, the host processor 214 establishes logical connections among the programmable processors 202 that are to perform the decompression operations. For example, a logical connection may be established between the memory 108 and the programmable processor 202F. A processor element in the programmable processor 202F may retrieve the compressed video from the memory 108 and insert frames back into the video (using, for example, interpolation). A different logical connection may be established between the programmable processor 202F and the programmable processor 202D. The video from the results from the programmable processor 202F are transmitted to the programmable processor 202D through the established logical connection. The programmable processor 202D may perform an image scale operation to increase the image size of the video. Another logical connection may be established between the programmable processor 202D and the I/O interface 208. The video from the results from the programmable processor 202D are transmitted to the I/O interface 208 through the established logical connection. The video is outputted therefrom to the video display processor 110.

While described such that there is one-to-one relationship between the number of compression operations and the decompression operations, embodiments are not so limited. Returning to the example above to illustrate, in one embodiment, the insertion of frames back into the video is not performed in order to increase the execution of the decompression and display.

With regard to the display of video based on the control input (at block 1410), the display of video on the video display 112 may be paused. Accordingly, the decompression operations described above are not performed. Additionally, the programmable processing unit 106 continues to compress and store the incoming video into the memory 108 (as described above in blocks 1406 and 1408).

Based on the control input, the display of the video on the video display 112 may be replayed. The host processor 214 receives the control input that indicates that the video is to be replayed. Accordingly, the host processor 214 configures the programmable processors 108 to decompress and display previous frames in reverse order until the control input is changed or the memory 108 does not include any stored video.

Based on the control input, the display of the video on the video display 112 may be fast forward until the incoming video is what is being displayed. For example, a user of the system 100 may desire to skip a commercial. Therefore, the host processor 214 configures the programmable processors 108 to decompress and display the video at a faster rate in comparison to when the video is being played.

Returning to the flow diagram 1400, in block 1412, upon determining that the system 100 is not in the storage mode (but rather the image processing mode), enhanced video processing is performed. With reference to the embodiment of FIG. 2, one or more processor elements in one or more programmable processors 202 perform the enhanced video processing. In one embodiment, the enhanced video processing includes ghost reduction operations, noise reduction operations (spatial, temporal, etc.), dot-crawl reduction operations, etc.

Returning to FIG. 2 to help illustrate, in one embodiment, the host processor 214 establishes logical connections among the I/O interface 208 and different programmable processors 202 involved in the enhanced video processing (as described above). Moreover, the host processor 214 may download microcode to be executed as part of the enhanced video processing operation. For example, assume that the programmable processor 202B is configured to perform a ghost reduction operation; the programmable processor 202H is configured to perform a spatial noise reduction operation; the programmable processor 202C is configured to perform a temporal noise reduction operation; and the programmable processor 202E is configured to perform a dot-crawl reduction operation.

Accordingly, the host processor 214 may download microcode into the programmable processor 202B, the programmable processor 202H, the programmable processor 202C and/or the programmable processor 202E. The host processor 214 also establishes a logical connection from the I/O interface 208 (where the data is received) to the programmable processor 202B (where the ghost reduction operation is performed). The host processor 214 also establishes a logical connection from the programmable processor 202B and the programmable processor 202H (where the spatial noise reduction operation is performed). Additionally, assuming that the temporal noise reduction operation is performed over a number of frames of the video data, the host processor 214 establishes a logical connection from the programmable processor 202H to the memory 108 (for storage of a number of frames of the video data prior to the temporal noise reduction operation). The host processor 214 also establishes a logical connection from the memory 108 to the programmable processor 202C. Therefore, after the given number of frames of the video data has been stored in the memory 108 from the output of the programmable processor 202H, the frames are inputted to the programmable processor 202C (where the temporal noise reduction operation is performed). The host processor 214 also establishes a logical connection from the programmable processor 202C and the programmable processor 202E (where the dot-crawl reduction operation is performed). The host processor also establishes a logical connection from the programmable processor 202E to the I/O interface 208, where the video data is output for display.

In block 1414, the video with enhanced video processing is displayed. With reference to the embodiment of FIGS. 1 and 2, the I/O interface 208 outputs the video data for display to the video display processor 110.

Additionally, in an embodiment, after the current mode of the system 100 is changed, the current operations are interrupted and control continues at point one, where a determination regarding the mode of the system at block 1404. For example, if the current mode is the image processing mode and the user selects the pause button to pause the display on the video display 112, the current mode is changed to the storage mode and control is interrupted and continued at point one.

While the flow diagram 1400 illustrates the compression of the video prior to storage, embodiments of the invention are not so limited. In another embodiment, the video is received and stored into the memory 108 without compression operations.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for a programmable video processing/storage architecture, in accordance with embodiments of the invention. A number of figures show flow diagrams illustrating operations for a programmable video processing/storage architecture. The operations of the flow diagrams will be described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. To illustrate, while operations have been described with reference to the programmable processing unit 106, embodiments of the invention are not so limited. For example, in an embodiment, the multiple mode operations may be performed by software applications executing in a single general purpose processor. Moreover, while described with reference to the processing of video, embodiments of the invention are not so limited. For example, in one embodiment, the multiple mode operations may be applicable to processing of other types of data such as audio, a combination of audio and video, etc. To further illustrate possible permutations to embodiments described herein, while the multiple mode operations are described in reference to two modes, embodiments of the invention are not so limited as there can be a greater number of such modes. For example, in an embodiment, a third mode of the programmable processing unit 106 may involve other aspects of video processing. Moreover, while embodiments have been described with regard to an analog tuner wherein an RF signal is received and an analog signal is generated, embodiments of the invention are not so limited. For example, in one embodiment, the video tuner 102 may be a digital tuner to receive the RF signal and to generate a digital signal. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method, comprising:
receiving a digital video signal into a programmable processing unit of a video display device, the video display device comprising a plurality of programmable processing units, and the video display device comprising a storage mode and an image processing mode, the storage mode comprising compressing and storing the digital video signal in a memory of the video display device and retrieving and decompressing the stored compressed digital video signal for display, and the image processing mode comprising displaying the digital video signal without compressing and storing the digital video signal in the memory;
receiving an input from a user;
if the received input comprises a first input; placing the video display device in the storage mode and downloading a first microcode into at least one programmable processor of the programmable processing unit; and
if the received input comprises a second input, placing the video display device in the image processing mode and downloading a second microcode into the at least one programmable processor of the programmable processing unit to perform enhanced image processing on the digital video signal, the second input being different from the first input.

2. The method according to claim 1, wherein the first input comprises a pause input, a rewind input or a save the digital video signal input, and
wherein the second input comprises an input that is different from a pause input, a rewind input or a save the digital video signal input.

3. The method according to claim 1, wherein the compressing of the digital video signal comprises at least one of a noise reduction operation, an image scaling operation, or a frame reduction operation.

4. The method according to claim 1, wherein image processing mode comprises performing a first enhanced image processing operation on the digital video signal, the first enhanced image processing operation comprising a reduction of at least one of ghosting, noise or dot-crawl.

5. The method according to claim 4, wherein the image processing mode further comprises performing a second enhanced image processing operation on the digital video signal, the second enhanced image processing operation being different from the first enhancedimage processing operation and comprising a reduction of one at least of ghosting, noise, or dot-crawl.

6. The method according to claim 5, wherein the enhanced image processing further includes performing a third enhanced image processing operation on the video, the third enhanced image processing operation being different from the first and second enhanced image processing operations and comprising reduction of at least one of ghosting, noise, or dot-crawl.

7. The method according to claim 1, wherein the decompressed digital video signal displayed in the storage mode is independent from the enhanced digital signal displayed in the image processing mode.

8. A video display device, comprising: a memory; and
at least one processor configured to determine whether the video display device is to be in a storage mode or in an image processing mode, the storage mode comprising a mode in which a digital video signal received by the video display device is to be compressed and stored in the memory and to be retrieved from the memory and decompressed for display, and the image processing mode comprising a mode in which the received digital video signal is to be displayed without compressing and storing the digital video signal in the memory,
the at least one processor being further configured to receive an input from a user,
if the received input is a first input, the at least one processor is configured to place the video display device into the storage mode and download a first microcode associated with the storage mode, and
if the received input is a second input, the at least one processor is configured to place the video display device into the image processing mode and download a second microcode associated with the image processing mode to perform enhanced image processing on the digital video signal, the second input being different from the first input.

9. The video display device according to claim 8, wherein the first input comprises a pause input, a rewind input or a save the digital video signal input, and
wherein the second input comprises an input that is different from a pause input, a rewind input or a save the digital video signal input.

10. The video display device according to claim 8, wherein compressing the digital video signal comprises at least one of a noise reduction operation, an image scaling operation, or a frame reduction operation.

11. The video display device according to claim 8, wherein the image processing mode comprises a first enhancement operation comprising reduction of at least one of ghosting, noise, or dot-crawl.

12. The video display device according to claim 11, wherein image processing mode further comprises a second enhancement operation comprising at reduction of at least one of ghosting, noise, or dot crawl, the first enhancement operation being different from the second enhancement operation.

13. The video display device according to claim 12, wherein image processing mode further comprises a third enhancement operation that is different from the first and second enhancement operations and comprises reduction of at least one of ghosting, noise, or dot-crawl.

14. The video display device according to claim 8, wherein the decompressed digital video signal displayed in the storage mode is independent from the enhanced digital signal displayed in the image processing mode.

15. A non-transitory machine-readable medium comprising a plurality of instructions that in response to being executed on a computing device, cause the computing device to perform operations comprising:
receiving a digital video signal into a programmable processing unit of a video display device, the video display device comprising a plurality of programmable processing units, the video display device further comprising a storage mode and an image processing mode, the storage mode comprising compressing and storing the digital video signal in a memory of the video display device and retrieving and decompressing the stored compressed digital video signal for display, and the image processing mode comprising displaying the digital video signal on the video display without compressing and storing the digital video signal in the memory;
receiving an input from a user;
if the received input comprises a first input; placing the video display device in the storage mode and downloading a first microcode into at least one programmable processor of the programmable processing unit; and
if the received input comprises a second input, placing the video display device in the image processing mode and downloading a second microcode into the at least one programmable processor of the programmable processing unit to perform enhanced image processing on the digital video signal, the second input being different from the first input.

16. The non-transitory machine-readable medium according to claim 15, wherein the first input comprises a pause input, a rewind input or a save the digital video signal input, and
wherein the second input comprises an input that is different from a pause input, a rewind input or a save the digital video signal input.

17. The non-transitory machine-readable medium according to claim 15, wherein compressing the digital video signal comprises at least one of a noise reduction operation, an image scaling operation, or a frame reduction operation, and
wherein the image processing mode comprises a first enhancement operation comprising reduction of at least one of ghosting, noise, or dot-crawl.

18. The non-transitory machine-readable medium according claim 17, wherein image processing mode further comprises a second enhanced image processing operation that is different from the enhanced image processing operation and comprising reduction of at least one of ghosting, noise, or dot-crawl.

19. The non-transitory machine-readable medium according to claim 18, wherein the image processing mode further includes a third enhanced image processing operation that is different from the first and second enhanced image processing operations and comprises reduction of at least one of ghosting, noise, or dot-crawl.

20. The non-transitory machine-readable medium according to claim 15, wherein the decompressed digital video signal displayed in the storage mode is independent from the enhanced digital signal displayed in the image processing mode.

* * * * *